(12) United States Patent
Tschudy et al.

(10) Patent No.: US 12,433,664 B2
(45) Date of Patent: Oct. 7, 2025

(54) MOTOR POSITION CONTROL AND METHODS FOR ROBOTIC ASSISTED SEALING INSTRUMENT

(71) Applicant: Covidien LP, Mansfield, MA (US)

(72) Inventors: Christopher T. Tschudy, Arvada, CO (US); Dylan R. Kingsley, Broomfield, CO (US); Brian Lillis, Boulder, CO (US); Max L Balter, Boston, MA (US)

(73) Assignee: Covidien LP, Mansfield, MA (US)

( * ) Notice: Subject to any disclaimer, the term of this patent is extended or adjusted under 35 U.S.C. 154(b) by 760 days.

(21) Appl. No.: 17/735,424

(22) Filed: May 3, 2022

(65) Prior Publication Data

US 2022/0346893 A1 Nov. 3, 2022

Related U.S. Application Data

(60) Provisional application No. 63/183,093, filed on May 3, 2021, provisional application No. 63/183,091, filed
(Continued)

(51) Int. Cl.
  *A61B 18/14* (2006.01)
  *A61B 17/00* (2006.01)
  (Continued)

(52) U.S. Cl.
  CPC ...... *A61B 18/1445* (2013.01); *A61B 17/3211* (2013.01); *A61B 34/30* (2016.02);
  (Continued)

(58) Field of Classification Search
  CPC . A61B 18/1445; A61B 17/3211; A61B 34/30; A61B 2017/00477;
  (Continued)

(56) References Cited

U.S. PATENT DOCUMENTS 5,752,973 A 5/1998 Kieturakis
5,792,135 A 8/1998 Madhani et al.
(Continued)

FOREIGN PATENT DOCUMENTS

EP 2792308 A2 10/2014
EP 2923657 A1 9/2015
(Continued)

OTHER PUBLICATIONS

International Search Report and Written Opinion issued in corresponding International Application No. PCT/US2022/027410 dated Sep. 30, 2022, 21 pages.
(Continued)

*Primary Examiner* — Linda C Dvorak
*Assistant Examiner* — William Mossbrook

(57) ABSTRACT

A robotic surgical instrument includes a housing having a shaft extending therefrom configured to receive a first end effector including jaw members moveable between a fully open position wherein the jaw members are spaced a maximum distance relative to one another and a closed position wherein a closure pressure between the jaw members is within a predetermined range. A drive rod actuates the first end effector upon translation thereof. The housing includes a spring compression assembly having proximal and distal hubs with the compression spring disposed therebetween. A jaw drive input rotates a drive gear to translate the distal hub relative to the proximal hub to compress the compression spring and actuate the end effector. Once the jaw members are fully open, the jaw drive input rotates a preset number of degrees to compress the compression spring and approximate the jaw members to a closure pressure within the predetermined range.

5 Claims, 20 Drawing Sheets

Related U.S. Application Data on May 3, 2021, provisional application No. 63/183,089, filed on May 3, 2021.

(51) Int. Cl.
  *A61B 17/3211* (2006.01)
  *A61B 18/00* (2006.01)
  *A61B 34/30* (2016.01)
  *A61B 90/00* (2016.01)

(52) U.S. Cl.
  CPC ............... *A61B 2017/00477* (2013.01); *A61B 2017/32113* (2013.01); *A61B 2018/0063* (2013.01); *A61B 2018/1452* (2013.01); *A61B 2090/066* (2016.02)

(58) Field of Classification Search
  CPC .. A61B 2017/32113; A61B 2018/0063; A61B 2018/1452; A61B 2090/066
  See application file for complete search history.

(56) References Cited

U.S. PATENT DOCUMENTS

| | | | |
|---|---|---|---|
| 5,848,986 | A | 12/1998 | Lundquist et al. |
| 6,817,974 | B2 | 11/2004 | Cooper et al. |
| 7,066,926 | B2 | 6/2006 | Wallace et al. |
| 7,386,365 | B2 | 6/2008 | Nixon |
| 7,699,835 | B2 | 4/2010 | Lee et al. |
| 7,798,386 | B2 | 9/2010 | Schall et al. |
| 7,799,028 | B2 | 9/2010 | Schechter et al. |
| 7,824,401 | B2 | 11/2010 | Manzo et al. |
| 7,861,906 | B2 | 1/2011 | Doll et al. |
| 7,862,554 | B2 | 1/2011 | Hegeman et al. |
| 7,877,243 | B2 | 1/2011 | Olien et al. |
| 7,918,230 | B2 | 4/2011 | Whitman et al. |
| 7,947,050 | B2 | 5/2011 | Lee et al. |
| 8,235,272 | B2 | 8/2012 | Nicholas et al. |
| 8,452,447 | B2 | 5/2013 | Nixon |
| 8,579,176 | B2 | 11/2013 | Smith et al. |
| 8,761,930 | B2 | 6/2014 | Nixon |
| 8,887,595 | B2 | 11/2014 | Williams |
| 8,939,963 | B2 | 1/2015 | Rogers et al. |
| 9,002,518 | B2 | 4/2015 | Manzo |
| 9,014,856 | B2 | 4/2015 | Manzo et al. |
| 9,055,961 | B2 | 6/2015 | Manzo et al. |
| 9,085,083 | B2 | 7/2015 | Nixon |
| 9,113,874 | B2 | 8/2015 | Shelton, IV et al. |
| 9,244,524 | B2 | 1/2016 | Inoue et al. |
| 9,295,514 | B2 | 3/2016 | Shelton, IV et al. |
| 9,317,651 | B2 | 4/2016 | Nixon |
| 9,332,987 | B2 | 5/2016 | Leimbach et al. |
| 9,339,342 | B2 | 5/2016 | Prisco et al. |
| 9,358,031 | B2 | 6/2016 | Scott |
| 9,408,668 | B2 | 8/2016 | Durant et al. |
| 9,474,569 | B2 | 10/2016 | Manzo et al. |
| 9,492,233 | B2 | 11/2016 | Williams |
| 9,498,242 | B2 | 11/2016 | Crews et al. |
| 9,522,003 | B2 | 12/2016 | Weir et al. |
| 9,623,563 | B2 | 4/2017 | Nixon |
| 9,664,262 | B2 | 5/2017 | Donlon et al. |
| 9,675,354 | B2 | 6/2017 | Weir et al. |
| 9,681,870 | B2 | 6/2017 | Baxter, III et al. |
| 9,687,311 | B2 | 6/2017 | Turner |
| 9,872,737 | B2 | 1/2018 | Nixon |
| 9,888,975 | B2 | 2/2018 | Auld |
| 9,913,694 | B2 | 3/2018 | Brisson |
| 9,955,988 | B2 | 5/2018 | Stefanchik et al. |
| 9,956,050 | B2 | 5/2018 | Overmyer et al. |
| 9,968,412 | B2 | 5/2018 | Overmyer et al. |
| 9,987,000 | B2 | 6/2018 | Shelton, IV et al. |
| 10,033,308 | B2 | 7/2018 | Chaghajerdi et al. |
| 10,105,136 | B2 | 10/2018 | Yates et al. |
| 10,130,437 | B2 | 11/2018 | Lee et al. |
| 10,149,727 | B2 | 12/2018 | Overmyer et al. |
| 10,155,316 | B2 | 12/2018 | Wakai et al. |
| 10,213,264 | B2 | 2/2019 | Tanner et al. |
| 10,277,097 | B2 | 4/2019 | Weir et al. |
| 10,327,773 | B2 | 6/2019 | Weir et al. |
| 10,327,837 | B2 | 6/2019 | Orban, III et al. |
| 10,376,331 | B2 | 8/2019 | Cooper et al. |
| 10,483,881 | B2 | 11/2019 | Liao et al. |
| 10,524,868 | B2 | 1/2020 | Cooper et al. |
| 10,575,909 | B2 | 3/2020 | Robinson et al. |
| 10,588,625 | B2 | 3/2020 | Weaner et al. |
| 10,595,946 | B2 | 3/2020 | Nixon |
| 10,743,897 | B2 | 8/2020 | Weir et al. |
| 10,751,051 | B2 | 8/2020 | Weir et al. |
| 10,765,432 | B2 | 9/2020 | Moore et al. |
| 10,765,486 | B2 | 9/2020 | Bajo et al. |
| 10,765,487 | B2 | 9/2020 | Ho et al. |
| 10,772,693 | B2 | 9/2020 | Kernbaum et al. |
| 10,874,465 | B2 | 12/2020 | Weir et al. |
| 10,874,474 | B2 | 12/2020 | Wu et al. |
| 10,881,469 | B2 | 1/2021 | Robinson |
| 10,945,798 | B2 | 3/2021 | Yates et al. |
| 10,959,797 | B2 | 3/2021 | Licht et al. |
| 11,098,803 | B2 | 8/2021 | Duque et al. |
| 11,154,185 | B2 | 10/2021 | Pistor et al. |
| 11,166,777 | B2 | 11/2021 | Saulenas et al. |
| 11,172,999 | B2 | 11/2021 | Lee et al. |
| 11,179,206 | B2 | 11/2021 | Anglese |
| 11,234,757 | B2 | 2/2022 | Worrell et al. |
| 11,272,977 | B2 | 3/2022 | Manzo et al. |
| 11,272,994 | B2 | 3/2022 | Saraliev et al. |
| 11,311,344 | B2 | 4/2022 | Parihar |
| 11,357,526 | B2 | 6/2022 | Steger |
| 11,518,048 | B2 | 12/2022 | Saraliev et al. |
| 2002/0099371 | A1 | 7/2002 | Schulze et al. |
| 2002/0177842 | A1 | 11/2002 | Weiss |
| 2003/0125734 | A1 | 7/2003 | Mollenauer |
| 2003/0208186 | A1 | 11/2003 | Moreyra |
| 2006/0022015 | A1 | 2/2006 | Shelton et al. |
| 2006/0025811 | A1 | 2/2006 | Shelton |
| 2006/0161138 | A1 | 7/2006 | Orban, III |
| 2007/0233052 | A1 | 10/2007 | Brock |
| 2008/0015631 | A1 | 1/2008 | Lee et al. |
| 2010/0274265 | A1 | 10/2010 | Wingardner et al. |
| 2010/0292691 | A1 | 11/2010 | Brogna |
| 2011/0118707 | A1 | 5/2011 | Burbank |
| 2011/0118708 | A1 | 5/2011 | Burbank et al. |
| 2011/0118709 | A1 | 5/2011 | Burbank |
| 2011/0118754 | A1 | 5/2011 | Dachs, II et al. |
| 2014/0276723 | A1 | 9/2014 | Parihar et al. |
| 2017/0042560 | A1 | 2/2017 | Lee et al. |
| 2018/0206904 | A1 | 7/2018 | Felder et al. |
| 2018/0263717 | A1 | 9/2018 | Kopp |
| 2020/0054403 | A1* | 2/2020 | Zhou ..................... A61B 34/37 |
| 2020/0129255 | A1 | 4/2020 | Kallenberger |
| 2020/0178971 | A1 | 6/2020 | Harris et al. |
| 2022/0346862 | A1 | 11/2022 | Tschudy et al. |
| 2024/0238000 | A1 | 7/2024 | Kingsley et al. |

FOREIGN PATENT DOCUMENTS

| | | | |
|---|---|---|---|
| EP | 3498158 A1 | 6/2019 | |
| EP | 3689282 A1 | 8/2020 | |
| WO | WO-2019043508 A2 * | 3/2019 | ....... A61B 17/07207 |
| WO | 2022081289 A1 | 4/2022 | |

OTHER PUBLICATIONS

International Search Report and Written Opinion received for PCT Patent Application No. PCT/US2022/027438, mailed on Jul. 27, 2022, 12 pages.

International Preliminary Report on Patentability received for PCT Patent Application No. PCT/US2022/027438, mailed on Nov. 16, 2023, 9 pages.

International Preliminary Report on Patentability received for PCT

(56) References Cited

OTHER PUBLICATIONS

Patent Application No. PCT/US2022/027410, mailed on Nov. 16, 2023, 12 pages.

* cited by examiner

MOTOR POSITION CONTROL AND METHODS FOR ROBOTIC ASSISTED SEALING INSTRUMENT

CROSS REFERENCE TO RELATED APPLICATION

This application claims the benefit of U.S. Provisional Application Ser. Nos. 63/183,089, 63/183,091 and 63/183,093 all filed May 3, 2021, the entire contents of each of which being incorporated by reference herein.

FIELD

The present disclosure relates to surgical instruments and, more specifically, to sealing instruments such as, for example, for use in robotic surgical systems, and methods relating to the same.

BACKGROUND

Robotic surgical systems are increasingly utilized in various different surgical procedures. Some robotic surgical systems include a console supporting a robotic arm. One or more different surgical instruments may be configured for use with the robotic surgical system and selectively mountable to the robotic arm. The robotic arm provides one or more inputs to the mounted surgical instrument to enable operation of the mounted surgical instrument.

When treating tissue, the closure force between jaw members of a surgical instrument may need to be consistently monitored to properly treat tissue and avoid tissue damage. As a result, instrument manufacturers typically include one or more sensors, e.g., torque sensors, to monitor the torque on the closing screw or shaft which generally correlates to the closure pressure between jaw members. Over repeated use, this technique is generally not consistent.

When sealing tissue, the closure pressure between jaw members needs to fall within a preferred range to insure a proper and consistent seal. Utilizing one or more sensors is generally not reliable and, over time, the correlation of these readings to actual closure pressure between jaw members becomes less reliable and consistent with repeated use.

SUMMARY

As used herein, the term "distal" refers to the portion that is being described which is further from an operator (whether a human surgeon or a surgical robot), while the term "proximal" refers to the portion that is being described which is closer to the operator. The terms "about," substantially," and the like, as utilized herein, are meant to account for manufacturing, material, environmental, use, and/or measurement tolerances and variations. Further, to the extent consistent, any of the aspects described herein may be used in conjunction with any or all of the other aspects described herein. Moreover, rotation may be measure in degrees or radians.

Provided in accordance with aspects of the present disclosure is a robotic surgical instrument that includes a housing having a shaft extending therefrom configured to receive a first selectively engageable end effector assembly at a distal end thereof. The first selectively engageable end effector assembly includes a pair of jaw members moveable between a fully open position wherein the jaw members are spaced a maximum distance relative to one another and a closed position wherein a closure pressure between the jaw members is within the range of about 3 $kg/cm^2$ to about 16 $kg/cm^2$. The shaft includes a drive rod extending therethrough configured to actuate the first selectively engageable end effector assembly upon translation thereof, the housing including a spring compression assembly supported within the housing. The spring compression assembly includes a proximal hub configured to secure a proximal end of the drive rod of the selectively engageable end effector disposed therethrough, a distal hub spaced from the proximal hub and including a plurality of teeth disposed thereon, and a compression spring having a known spring constant mounted between the proximal and distal hubs.

A jaw drive input is included and is configured to rotate a jaw drive input shaft having a drive gear disposed thereon. The drive gear is configured to matingly engage the corresponding plurality of teeth of the distal hub such that rotation thereof translates the distal hub relative to the proximal hub to compress the compression spring and translate the drive rod of the first selectively engageable end effector to move the jaw members relative to one another, wherein once the jaw members are moved to the fully open position, the jaw drive input is configured to rotate the jaw drive input shaft a preset number of degrees of rotation to compress the compression spring and approximate the jaw members to a closure pressure within the range of about 3 $kg/cm^2$ to about 16 $kg/cm^2$.

In aspects according to the present disclosure, the housing is configured such that subsequent selectively engageable end effector assemblies may be interchanged with the first selectively engageable end effector assembly without recalibrating the preset number of degrees of rotation of the jaw drive input shaft from the fully open position of the jaw members. In other aspects according to the present disclosure, the preset degrees of rotation of the jaw drive input from the fully open position of the jaw members correspondingly compresses the compression spring a preset distance to ensure that the closure pressure falls within the range of about 3 $kg/cm^2$ to about 16 $kg/cm^2$ during repeated use.

In aspects according to the present disclosure, the preset degrees of rotation of the jaw drive input from the fully open position of the jaw members of the first selectively engageable end effector assembly or any subsequent selectively engageable end effector assembly correspondingly compresses the compression spring the same distance to ensure that the closure pressure falls within the range of about 3 $kg/cm^2$ to about 16 $kg/cm^2$ during repeated use. In other aspects according to the present disclosure, the preset degrees of rotation is about 1500 degrees to about 3000 degrees depending on, among other things, the disposition of the shaft.

The present disclosure also relates to a method of sealing tissue using a robotic surgical instrument and includes: selectively engaging an end effector onto a housing of a robotic surgical instrument and coupling the end effector to an actuation assembly; opening a pair of jaw members of the end effector to a fully open position; placing tissue between the jaw members; and actuating a jaw drive input of the actuation assembly to rotate a jaw drive input shaft a preset number of degrees of rotation to compress a compression spring a preset distance to approximate the pair of jaw members relative to one another between the fully open position to an approximated position wherein a closure pressure between the jaw members is within the range of about 3 $kg/cm^2$ to about 16 $kg/cm^2$.

In aspects according to the present disclosure, the opening of the jaw members of the end effector to a fully open position includes actuating the jaw drive input to open the jaw members to a fully open position.

In aspects according to the present disclosure, the method includes determining the jaw members are disposed in a fully open position. In other aspects according to the present disclosure, determining the jaw members are disposed in a fully open position includes at least one of a visual, audible or tactile feedback. In yet other aspects according to the present disclosure, determining the jaw members are disposed in a fully open position includes at least one of an algorithm, a position sensor or a torque sensor.

The present disclosure also relates to a method of determining a homing position for a pair of jaw members for sealing tissue using a robotic surgical instrument and includes: selectively engaging an end effector onto a housing of a robotic surgical instrument and coupling the end effector to a jaw drive input; communicating with the end effector to recognize the end effector and associated operating parameters and characteristics therewith and communicating operational data back to an EPROM or PCB; and initiating a homing algorithm to determine a fully open position of the jaw members, the homing algorithm. The initiating of the homing algorithm to determine a fully open position of the jaw members includes: initiating rotation of the jaw drive input to open the jaw members; calculating a baseline torque running average utilizing one or more torque sensors associated with the jaw drive input; analyzing readings from the torque sensor(s) to determine a change in the average torque over time (Δ torque); once a predetermined change in the average torque over time (Δ torque) has been determined, equating the change in the average torque over time (Δ torque) to the jaw members being in a fully open position relative to one another to identify a homing position of the jaw members.

In aspects according to the present disclosure, after identifying a homing position of the jaw drive input, the method includes repeatably rotating the jaw drive input a predetermined number of degrees from the homing position to compress a compression spring such that the closure force between the jaw members repeatably falls within the range of about 3 kg/cm$^2$ to about 16 Kg/cm$^2$.

In aspects according to the present disclosure, wherein after calculating a baseline torque running average utilizing one or more torque sensors associated with the jaw drive input, the method includes filtering the torque reading through a low pass filter to avoid false readings from the torque sensor(s) to allow a more accurate average torque reading.

In aspects according to the present disclosure, wherein after rotating the jaw drive input the predetermined number of degrees from the homing position to insure that the closure force between the jaw members falls within the range of about 3 kg/cm$^2$ to about 16 Kg/cm$^2$, the method includes disengaging the end effector from the housing of the robotic surgical instrument and repeating the method with a new end effector.

In aspects according to the present disclosure, the predetermined number of rotations or degrees of rotation of the jaw drive input is dependent on at least one of the type of compression spring, spring constant of the compression spring, size of jaw drive input shaft, or thread ratio of the jaw drive input shaft. In other aspects according to the present disclosure, the predetermined number of degrees of rotation of the jaw drive input from the homing position is 1500 degrees.

In aspects according to the present disclosure, the predetermined number of degrees of rotation of the jaw drive input from the homing position is stored in the EPROM or PCB. In other aspects according to the present disclosure, the predetermined number of degrees of rotation of the jaw drive input is based on the associated operating parameters and characteristics of the end effector and is stored in the EPROM or PCB.

The present disclosure also relates to a method of determining a homing position for a pair of jaw members for sealing tissue using a robotic surgical instrument and includes: selectively engaging an end effector onto a housing of a robotic surgical instrument and coupling the end effector to a jaw drive input, the end effector having known operating parameters and characteristics embedded within an EPROM or PCB; and initiating a homing algorithm to determine a fully open position of the jaw members, the homing algorithm including: initiating rotation of the jaw drive input to open the jaw members; calculating a baseline torque running average utilizing one or more torque sensors associated with the jaw drive input; analyzing readings from the torque sensor(s) to determine a change in the average torque over time (Δ torque); and once a predetermined change in the average torque over time (Δ torque) has been determined, equating the change in the average torque over time (Δ torque) to the jaw members being in a fully open position relative to one another to identify a homing position of the jaw members.

In aspects according to the present disclosure, after identifying a homing position of the jaw members, the method includes repeatably rotating the jaw drive input a predetermined number of radians or degrees from the homing position to compress a compression spring such that the closure force between the jaw members repeatably falls within the range of about 3 kg/cm$^2$ to about 16 Kg/cm$^2$.

In aspects according to the present disclosure, after calculating a baseline torque running average utilizing one or more torque sensors associated with the jaw drive input, the method includes filtering the torque reading through a low pass filter to avoid false readings from the torque sensor(s) to allow a more accurate average torque reading.

In aspects according to the present disclosure, the predetermined number of degrees of rotation of the jaw drive input from the homing position is stored in the EPROM or PCB. In other aspects according to the present disclosure, the predetermined number of rotations or degrees of rotation of the jaw drive input is dependent on at least one of the type of compression spring, spring constant of the compression spring, size of jaw drive input shaft, or thread ratio of the jaw drive input shaft. In still other aspects according to the present disclosure, the predetermined number of degrees of rotation of the jaw drive input from the homing position is about 1500 degrees to about 3000 degrees (or equivalent radians) In yet other aspects according to the present disclosure, the predetermined number of degrees of rotation of the jaw drive input is based on the associated operating parameters and characteristics of the end effector and is stored in the EPROM or PCB.

In aspects according to the present disclosure, the method includes communicating the homing position of the jaw members to the EPROM or PCB for calibration of the jaw drive input.

The present disclosure also relates to a method of determining a homing position for a pair of jaw members for sealing tissue using a robotic surgical instrument and includes: initiating a homing algorithm to determine a fully open position of a pair of jaw members, the homing algorithm including: initiating rotation of a jaw drive input to open the jaw members; calculating a baseline torque running average utilizing one or more torque sensors associated with the jaw drive input; analyzing readings from the torque sensor(s) to determine a change in the average torque over time (Δ torque); and once a predetermined change in the average torque over time (Δ torque) has been determined, equating the change in the average torque over time (Δ torque) to the jaw members being in a fully open position relative to one another to identify a homing position of the jaw members.

The present disclosure also relates to a method of determining a homing position for a pair of jaw members for sealing tissue using a robotic surgical instrument and includes: selectively engaging an end effector onto a housing of a robotic surgical instrument and coupling the end effector to a jaw drive input; communicating with the end effector to recognize the end effector and associated operating parameters and characteristics therewith and communicating operational data back to an EPROM or PCB; and initiating a homing algorithm to determine a home or fully open position of the jaw members. The homing algorithm includes: initiating rotation of the jaw drive input 180 degrees to close the jaw members relative to one another and ignoring torque reading from one or more sensors associated with the jaw drive input during the initial 180 degrees of rotation; continually rotating the jaw drive input to close the jaw members until a torque is measured on the jaw drive input in the range of about 20 Nmm to about 50 Nmm and marking the position of the jaw drive input as position zero; rotating the jaw drive input about 360 degrees to open the jaw members relative to one another and ignoring torque spikes up to about 360 degrees; rotating the jaw drive input between about 360 degrees to about 1080 degrees and taking a running average torque reading on the jaw drive input; continually rotating the jaw drive input past 1080 degrees and looking for a torque increase of >25 Nmm from the running average torque and assigning this jaw drive input position a trigger point limit; and calculating the homing position of the jaw members on the jaw drive input as the trigger point limit position minus about 74 degrees.

In aspects according to the present disclosure, the method further includes: rotating the jaw drive input a predetermined number of degrees from the homing position to insure that the closure force between the jaw members falls within the range of about 3 kg/cm$^2$ to about 16 Kg/cm$^2$. In other aspects according to the present disclosure, the predetermined number of degrees of rotation is about 1500 degrees to about 3000 degrees.

The present disclosure also relates to a method of determining a homing position for a knife blade of a robotic surgical instrument and includes: selectively engaging an end effector onto a housing of a robotic surgical instrument and coupling the end effector to a jaw drive input; communicating with the end effector to recognize the end effector and associated operating parameters and characteristics therewith and communicating operational data back to an EPROM or PCB; and initiating a homing algorithm to determine a fully retracted or home position of a knife blade disposed between the jaw members.

The homing algorithm includes: actuating a knife drive coupler of the robotic surgical instrument to advance the knife blade about 180 degrees to insure engagement with a knife drive tube of the robotic surgical instrument (or other couplers) and ignoring any torque readings from one or more sensors associated with the knife drive coupler during this initial step; continually actuating the knife drive coupler to advance the knife blade about an additional 500 degrees or until a torque is measured on the knife drive coupler in the range of about 4 Nmm to about 500 Nmm and marking the position on the knife drive coupler as knife position "zero"; if the knife drive coupler moved an additional 500 degrees without reaching the torque limit, rotating the knife drive coupler between about 100 degrees to about 580 degrees to retract the knife blade and taking a running average torque reading on the knife drive coupler; continually rotating the knife drive coupler to retract the knife blade past 580 degrees looking for a torque increase on the knife drive input of greater than about 20 Nmm from the running average torque reading and assigning this position of the knife drive input as a "knife point limit"; and calculating a homing position of the knife blade as the "knife point limit" position minus about 50 degrees of rotation of the knife drive coupler. If the knife drive coupler reaches a torque limit prematurely, an error may be communicated to the user regarding inoperable blade or to retry homing.

In aspects according to the present disclosure, the method further includes: disengaging the end effector from the housing of the robotic surgical instrument and repeating the method for finding the homing position for the knife blade of a new end effector.

The present disclosure also relates to a method of determining a homing position for a knife blade of a robotic surgical instrument and includes: initiating a homing algorithm to determine a fully retracted or home position of a knife blade disposed between a pair of jaw members of a robotic surgical instrument, the homing algorithm including: actuating a knife drive coupler of the robotic surgical instrument to advance the knife blade about 180 degrees to insure engagement with a knife assembly of the robotic surgical instrument and ignoring any torque readings from one or more sensors associated with the knife drive coupler during this initial step; continually actuating the knife drive coupler to advance the knife blade about an additional 500 degrees or until a torque is measured on the knife drive coupler in the range of about 40 Nmm to about 500 Nmm and marking the position on the knife drive coupler as knife position "zero"; if the knife drive coupler moved an additional 500 degrees without reaching the torque limit, rotating the knife drive coupler between about 100 degrees to about 580 degrees to retract the knife blade and taking a running average torque reading on the knife drive coupler; and continually rotating the knife drive coupler to retract the knife blade past 580 degrees looking for a torque increase on the knife drive input of greater than 20 Nmm from the running average torque reading and assigning this position of the knife drive input as a "knife point limit"; and calculating a homing position of the knife blade as the "knife point limit" position minus about 50 degrees of rotation of the knife drive coupler. If the knife drive coupler reaches a torque limit prematurely, an error may be communicated to the user regarding inoperable blade or to retry homing.

In aspects according to the present disclosure, the method further includes: disengaging the end effector from the housing of the robotic surgical instrument and repeating the method for finding the homing position for the knife blade of a new end effector.

The present disclosure also relates to a method of determining a homing position for a knife blade of a robotic surgical instrument and includes: initiating a homing algorithm to determine a fully retracted or home position of a knife blade disposed between a pair of jaw members of a robotic surgical instrument, the homing algorithm including: actuating a knife drive coupler of the robotic surgical instrument to advance the knife blade to insure engagement with a knife assembly of the robotic surgical instrument and ignoring any torque readings from one or more sensors associated with the knife drive coupler during this initial step; continually actuating the knife drive coupler to advance the knife blade about an additional 500 degrees or until a torque is measured on the knife drive coupler in the range of about 40 Nmm to about 500 Nmm and marking the position on the knife drive coupler as knife position "zero"; if the knife drive coupler moved an additional 500 degrees without reaching the torque limit, rotating the knife drive coupler to retract the knife blade looking for a torque increase on the knife drive input of greater than 20 Nmm from the running average torque reading and assigning this position of the knife drive input as a "knife point limit"; and calculating a homing position of the knife blade as the "knife point limit" position minus about 50 degrees of rotation of the knife drive coupler. If the knife drive coupler reaches a torque limit prematurely, an error may be communicated to the user regarding inoperable blade or to retry homing.

The present disclosure also relates to a method of determining a homing position for an articulating section of a shaft of a robotic surgical instrument and includes: selectively engaging a shaft and end effector onto a housing of a robotic surgical instrument and coupling the shaft to a jaw drive input; communicating with the end effector to recognize the end effector and associated operating parameters and characteristics therewith and communicating operational data back to an EPROM or PCB; and initiating a homing algorithm to determine a home or straight position of an articulating section of the shaft.

The homing algorithm includes: entrapping the articulation section within a trocar (or any hollow cylinder); actuating articulation couplers of the robotic surgical instrument to articulate the articulation section in a first direction until the articulation section bumps against an inner peripheral surface of the trocar and a torque is measured on the articulation couplers of about 20 Nmm; marking the position of articulation couplers as a first "end point" or "edge"; repeating the step of actuating the articulation couplers to articulate the articulation section in additional directions and determining additional "end points" or "edges"; and calculating a centralized or home position "X" of the articulating section using at least three "end points" or "edges".

In aspects according to the present disclosure, the method further includes: disengaging the shaft from the housing of the robotic surgical instrument and repeating the method for finding the homing position for the articulating section of a new shaft.

The present disclosure also relates to a method of determining a homing position for an articulating section of a shaft of a robotic surgical instrument and includes: initiating a homing algorithm to determine a home or straight position of an articulating section of a shaft of a robotic surgical instrument, the homing algorithm including: entrapping the articulation section within a trocar; actuating articulation couplers of the robotic surgical instrument to articulate the articulation section in a first direction until the articulation section bumps against an inner peripheral surface of the trocar and a torque is measured on the articulation couplers of about 20 Nmm; marking the position of articulation couplers as a first "end point" or "edge"; repeating the step of actuating the articulation couplers to articulate the articulation section in additional directions and determining additional "end points" or "edges"; and calculating a centralized or home position "X" of the articulating section using at least three "end points" or "edges".

In aspects according to the present disclosure, the method further includes: disengaging the shaft from the housing of the robotic surgical instrument and repeating the method for finding the homing position for the articulating section of a new shaft.

The present disclosure also relates to a method for adjusting the degrees of rotation of a jaw drive input of a robotic surgical instrument for closing a pair of jaw members based on the amount of articulation in an articulating section of a shaft of the robotic surgical instrument and includes: engaging a shaft and end effector to a housing of a robotic surgical instrument and determining a fully open position of a pair of jaw members of the end effector; determining a straight or homing position of an articulating section of the shaft; manipulating the robotic instrument to position tissue between the jaw members; prior to initiating a jaw drive input to move the jaw members to grasp tissue under a closure pressure, determining an amount of articulation of the articulating section relative to the homing position of the articulation section; calculating frictional losses of one or more of a plurality of articulation cables disposed in the shaft based on the amount of articulation of the articulating section and adjusting a preset number of degrees of rotation of the jaw drive input to close the jaw members to insure the closure pressure between the jaw members falls within the range of about 3 kg/cm$^2$ to about 16 kg/cm$^2$; and actuating the jaw drive input to grasp tissue between the jaw members within the specified closure pressure range.

In aspects according to the present disclosure, the determining the amount of articulation of the articulating section relative to the homing position of the articulation section includes: entrapping the articulation section within a trocar; actuating articulation couplers of the robotic surgical instrument to articulate the articulation section in a first direction until the articulation section bumps against an inner peripheral surface of the trocar and a torque is measured on the articulation couplers of about 20 Nmm; marking the position of articulation couplers as a first "end point" or "edge"; repeating the step of actuating the articulation couplers to articulate the articulation section in additional directions and determining additional "end points" or "edges"; and calculating a centralized or home position "X" of the articulating section using at least three "end points" or "edges".

In aspects according to the present disclosure, the determining a fully open position of the pair of jaw members of the end effector includes initiating a homing algorithm to determine a fully open position of the pair of jaw members. The homing algorithm includes: initiating rotation of the jaw drive input to open the jaw members; calculating a baseline torque running average utilizing one or more torque sensors associated with the jaw drive input; analyzing readings from the torque sensor(s) to determine a change in the average torque over time (Δ torque); and once a predetermined change in the average torque over time (Δ torque) has been determined, equating the change in the average torque over time (Δ torque) to the jaw members being in a fully open or homing position relative to one another.

BRIEF DESCRIPTION OF THE DRAWINGS

Various aspects and features of the present disclosure are described hereinbelow with reference to the drawings wherein like numerals designate identical or corresponding elements in each of the several views.

DETAILED DESCRIPTION

Figure 1:
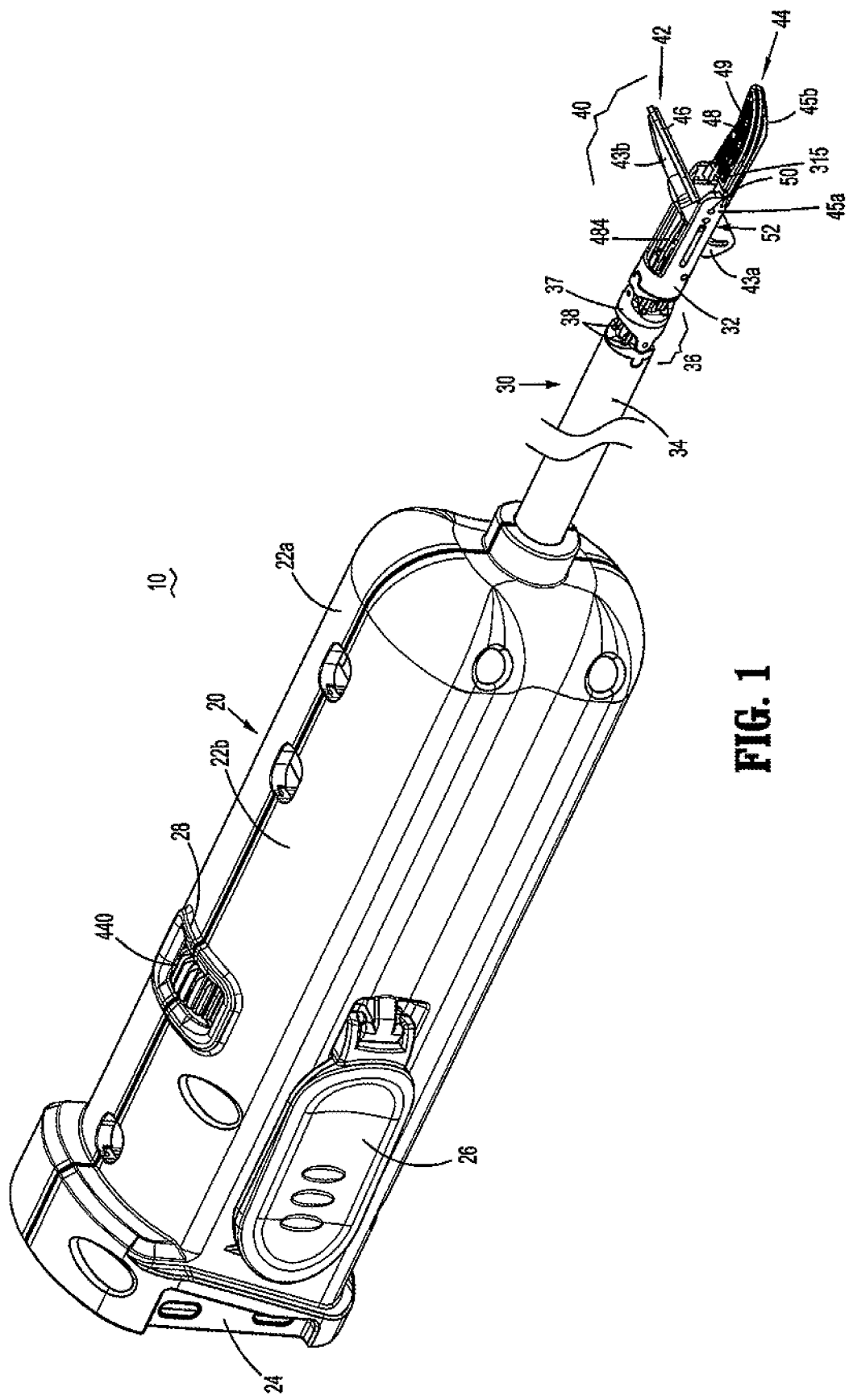
FIG. 1 is a perspective view of a robotic surgical instrument provided in accordance with the present disclosure configured for mounting on a robotic arm of a robotic surgical system.
Figure 2A:
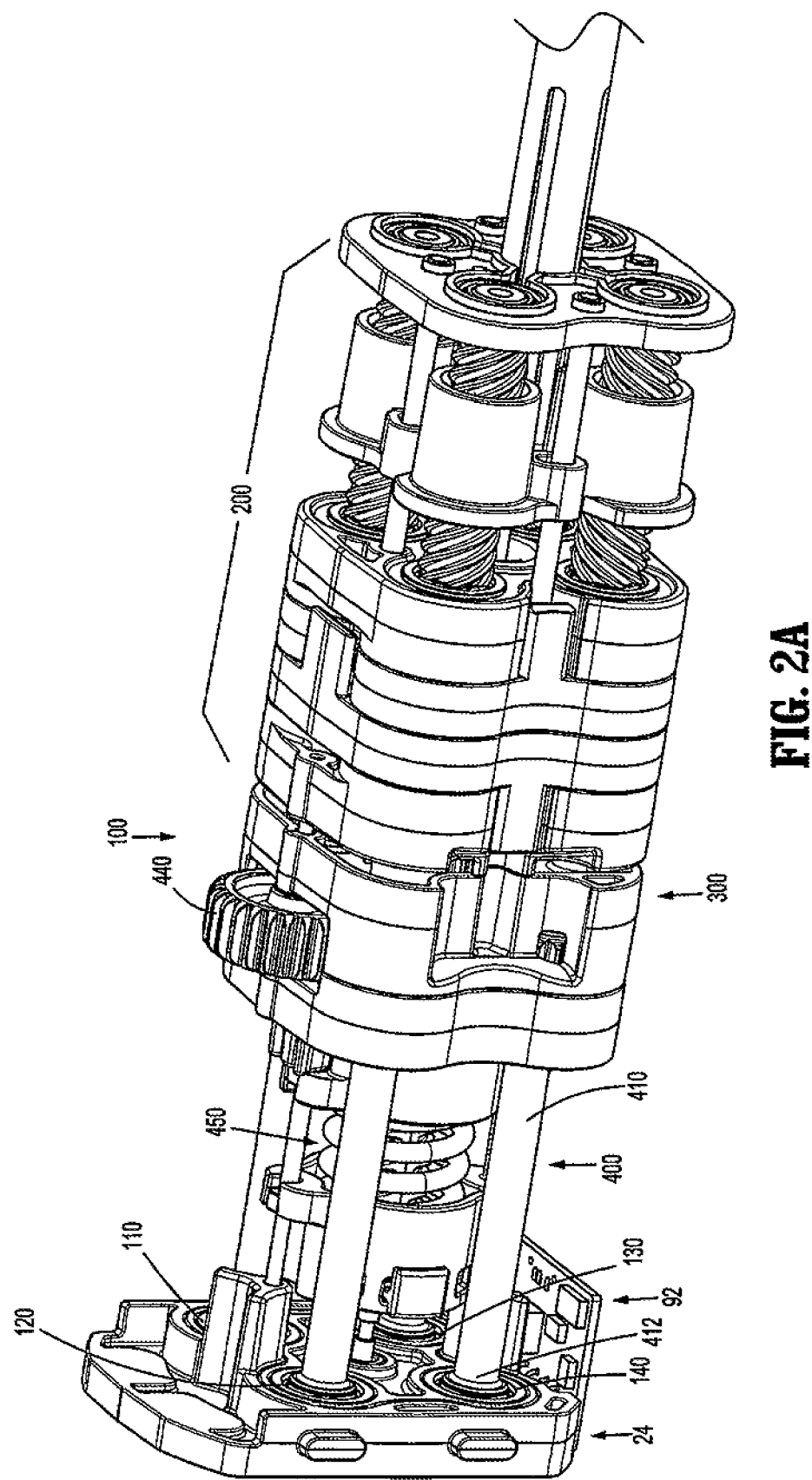
FIG. 2A is a front, perspective view of a proximal portion of the surgical instrument of FIG. 1 with an outer shell removed.
Figure 2B:
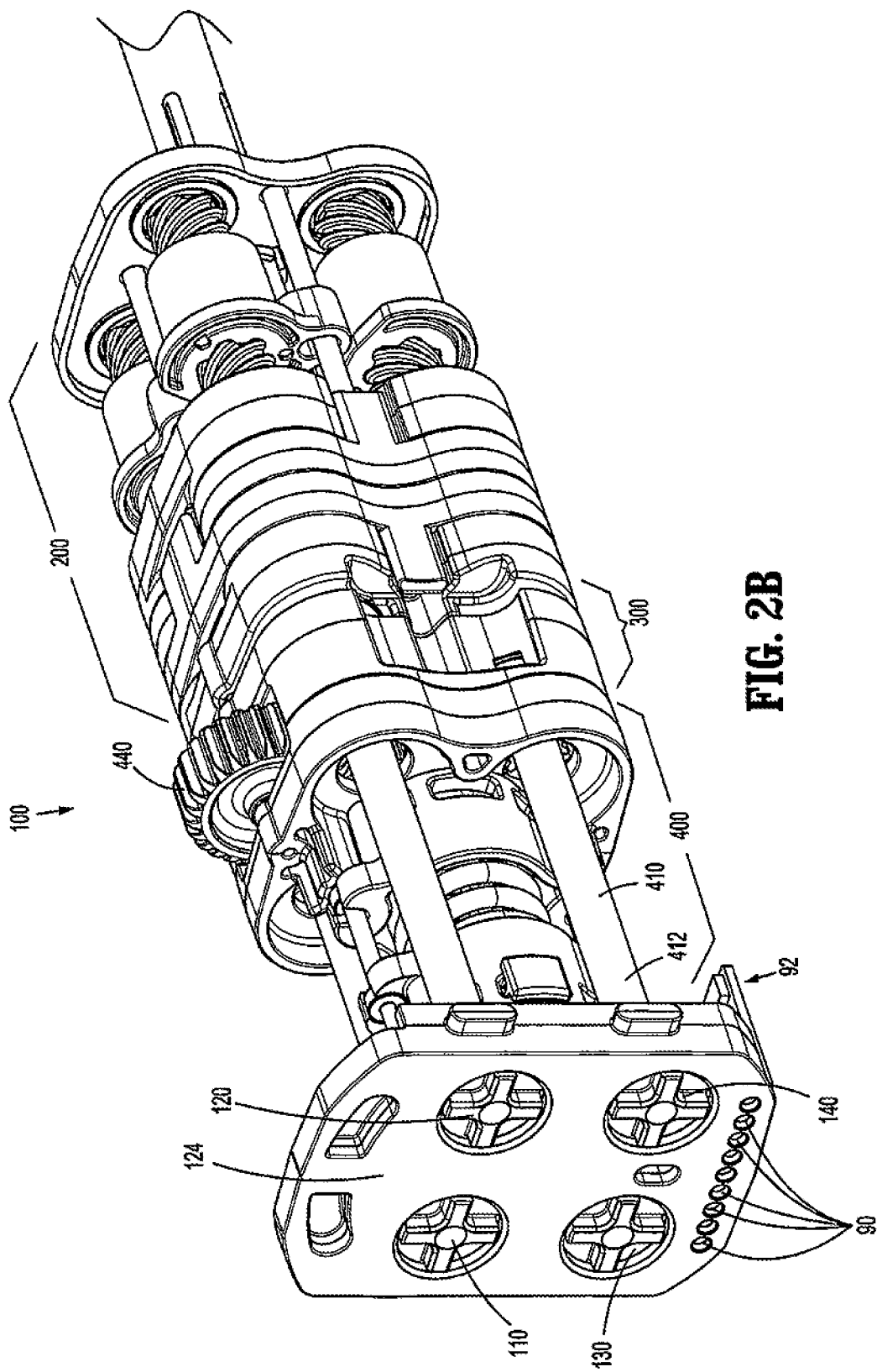
FIG. 2B is a rear, perspective view of the proximal portion of the surgical instrument of FIG. 1 with the outer shell removed.
Figure 3:
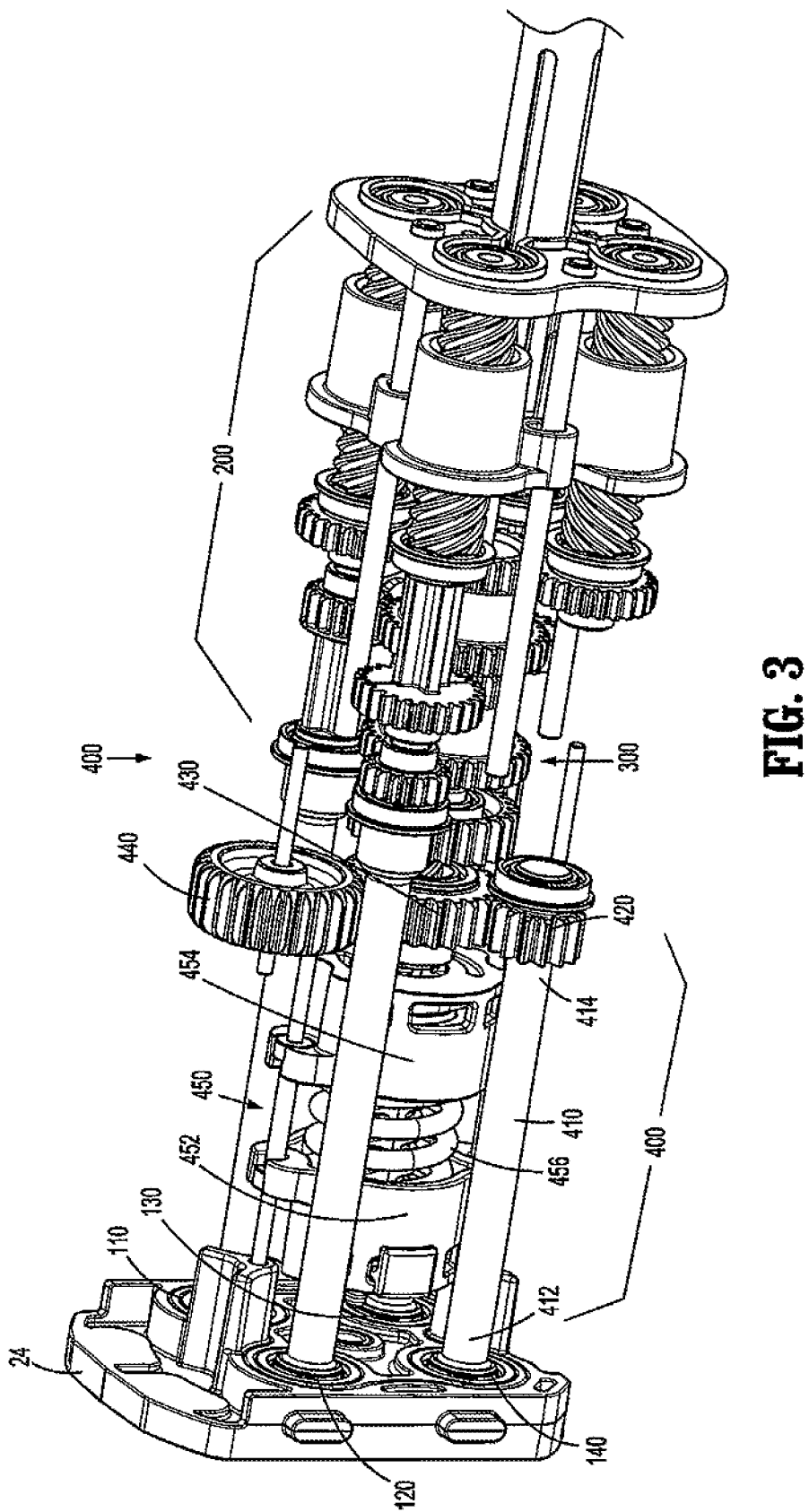
FIG. 3 is a front, perspective view of the proximal portion of the surgical instrument of FIG. 1 with the outer shell and additional internal components removed.
Figure 4:
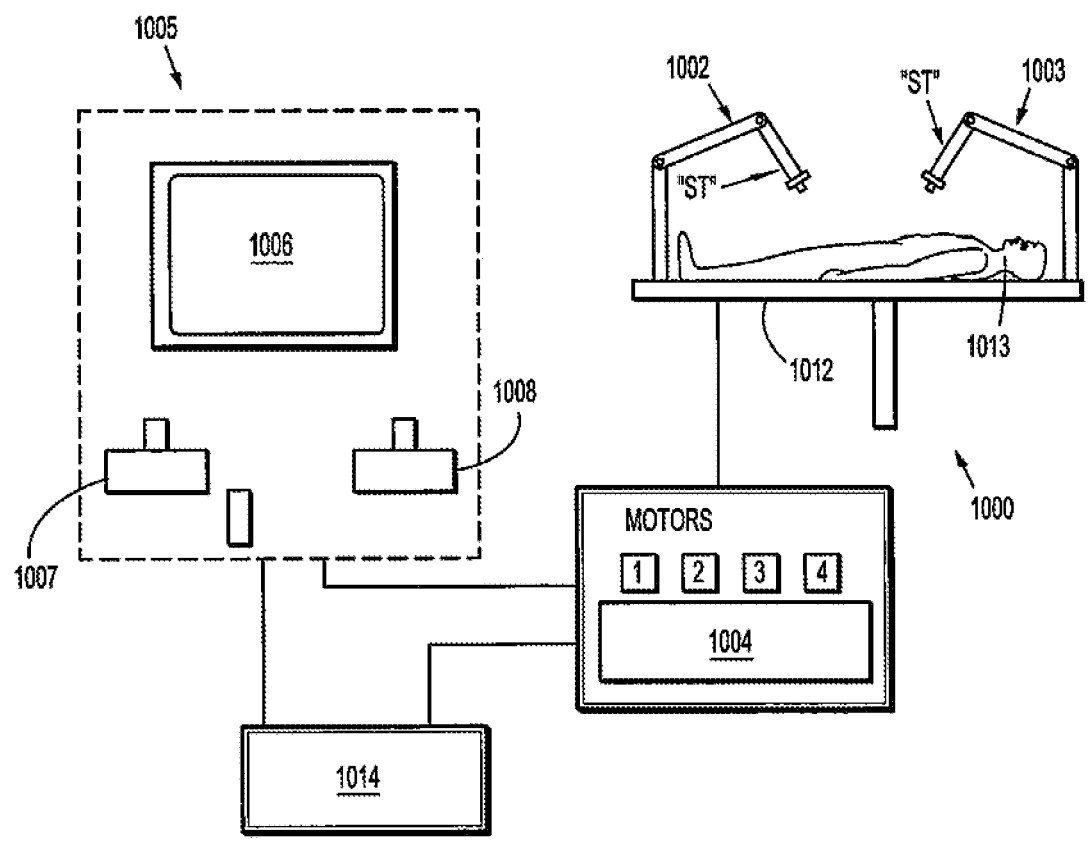
FIG. 4 is a schematic illustration of an exemplary robotic surgical system configured to releasably receive the surgical instrument of FIG. 1.

Referring to FIGS. 1-3, a surgical instrument 10 provided in accordance with the present disclosure generally includes a housing 20, a shaft 30 extending distally from housing 20, an end effector assembly 40 extending distally from shaft 30, and an actuation assembly 100 disposed within housing 20 and operably associated with end effector assembly 40. Instrument 10 is detailed herein as an articulating electro-surgical forceps configured for use with a robotic surgical system, e.g., robotic surgical system 1000 (FIG. 4). However, the aspects and features of instrument 10 provided in accordance with the present disclosure, detailed below, are equally applicable for use with other suitable surgical instruments, e.g., graspers, staplers, clip appliers, and/or in other suitable surgical systems, e.g., motorized or other power-driven systems.

With particular reference to FIG. 1, housing 20 of instrument 10 includes first and second body portion 22a, 22b and a proximal face plate 24 that cooperate to enclose actuation assembly 100 therein. Proximal face plate 24 includes apertures defined therein through which input couplers 110-140 (FIG. 2B) of actuation assembly 100 extend. A pair of latch levers 26 (only one of which is illustrated in FIG. 1) extending outwardly from opposing sides of housing 20 enable releasable engagement of housing 20 with a robotic arm of a surgical system, e.g., robotic surgical system 1000 (FIG. 4). An aperture 28 defined through housing 20 permits thumbwheel 440 to extend therethrough to enable manual manipulation of thumbwheel 440 from the exterior of housing 20 to permit manual opening and closing of end effector assembly 40.

Referring also to FIGS. 2A-3, a plurality of electrical contacts 90 extend through one or more apertures defined through proximal face plate 24 to enable electrical communication between instrument 10 and robotic surgical system 1000 (FIG. 4) when instrument 10 is engaged thereon, e.g., for the communication of data, control, and/or power signals therebetween. As an alternative to electrical contacts 90 extending through proximal face plate 24, other suitable transmitter, receiver, and/or transceiver components to enable the communication of data, control, and/or power signals are also contemplated, e.g., using RFID, Bluetooth®, WiFi®, or via any other suitable wired, wireless, contacted, or contactless communication method. At least some of the electrical contacts 90 are electrically coupled with electronics 92 mounted on an interior side of proximal face plate 24, e.g., within housing 20. Electronics 92 may include, for example, a storage device, a communications device (including suitable input/output components), and a CPU including a memory and a processor. Electronics 92 may be mounted on a circuit board or otherwise configured, e.g., as a chip.

The storage device of electronics 92 stores information relating to surgical instrument such as, for example: the item number, e.g., SKU number; date of manufacture; manufacture location, e.g., location code; serial number; lot number; use information; setting information; adjustment information; calibration information; security information, e.g., encryption key(s), and/or other suitable additional or alternative data. The storage device of electronics 92 may be, for example, a magnetic disk, flash memory, optical disk, or other suitable data storage device.

As an alternative or in addition to storing the above-noted information in the storage device of electronics 92, some or all of such information, e.g., the use information, calibration information, setting information, and/or adjustment information, may be stored in a storage device associated with robotic surgical system 1000 (FIG. 4), a remote server, a cloud server, etc., and accessible via instrument 10 and/or robotic surgical system 1000 (FIG. 4). In such configurations, the information may, for example, be updated by manufacturer-provided updates, and/or may be applied to individual instruments, units of instruments (e.g., units from the same manufacturing location, manufacturing period, lot number, etc.), or across all instruments. Further still, even where the information is stored locally on each instrument, this information may be updated by manufacturer-provided updates manually or automatically upon connection to the robotic surgical system 1000 (FIG. 4).

Referring again to FIG. 1, shaft 30 of instrument 10 includes a distal segment 32, a proximal segment 34, and an articulating section 36 disposed between the distal and proximal segments 32, 34, respectively. Articulating section 36 includes one or more articulating components 37, e.g., links, joints, etc. A plurality of articulation cables 38, e.g., four (4) articulation cables, or other suitable actuators, extend through articulating section 36. More specifically, articulation cables 38 are operably coupled to distal segment 32 of shaft 30 at the distal ends thereof and extend proximally from distal segment 32 of shaft 30, through articulating section 36 of shaft 30 and proximal segment 34 of shaft 30, and into housing 20, wherein articulation cables 38 operably couple with an articulation sub-assembly 200 of actuation assembly 100 to enable selective articulation of distal segment 32 (and, thus end effector assembly 40) relative to proximal segment 34 and housing 20, e.g., about at least two axes of articulation (yaw and pitch articulation, for example). Articulation cables 38 are arranged in a generally rectangular configuration, although other suitable configurations are also contemplated. In some configurations, as an alternative, shaft 30 is substantially rigid, malleable, or flexible and not configured for active articulation.

With respect to articulation of end effector assembly 40 relative to proximal segment 34 of shaft 30, actuation of articulation cables 38 may be accomplished in pairs. More specifically, in order to pitch end effector assembly 40, the upper pair of cables 38 are actuated in a similar manner while the lower pair of cables 38 are actuated in a similar manner relative to one another but an opposite manner relative to the upper pair of cables 38. With respect to yaw articulation, the right pair of cables 38 are actuated in a similar manner while the left pair of cables 38 are actuated in a similar manner relative to one another but an opposite manner relative to the right pair of cables 38. Other configurations of articulation cables 38 or other articulation actuators are also contemplated.

Continuing with reference to FIG. 1, end effector assembly 40 includes first and second jaw members 42, 44, respectively. Each jaw member 42, 44 includes a proximal flange portion 43a, 45a and a distal body portion 43b, 45b, respectively. Distal body portions 43b, 45b define opposed tissue-contacting surfaces 46, 48, respectively. Proximal flange portions 43a, 45a are pivotably coupled to one another about a pivot 50 and are operably coupled to one another via a cam-slot assembly 52 including a cam pin slidably received within cam slots defined within the proximal flange portion 43a, 45a of at least one of the jaw members 42, 44, respectively, to enable pivoting of jaw member 42 relative to jaw member 44 and distal segment 32 of shaft 30 between a spaced-apart position (e.g., an open position of end effector assembly 40) and an approximated position (e.g., a closed position of end effector assembly 40) for grasping tissue "T" (FIGS. 8 and 10) between tissue-contacting surfaces 46, 48. As an alternative to this unilateral configuration, a bilateral configuration may be provided whereby both jaw members 42, 44 are pivotable relative to one another and distal segment 32 of shaft 30. Other suitable jaw actuation mechanisms are also contemplated.

In configurations, a longitudinally-extending knife channel 49 (only knife channel 49 of jaw member 44 is illustrated; the knife channel of jaw member 42 is similarly configured) is defined through the tissue-contacting surface 46, 48 of one or both jaw members 42, 44. In such embodiments, a knife assembly including a knife tube 62 (FIG. 6) extending from housing 20 through shaft 30 to end effector assembly 40 and a knife blade 315 disposed within end effector assembly 40 between jaw members 42, 44 is provided. The knife blade 315 is selectively translatable through the knife channel(s) 49 and between the jaw member 42, 44 to cut tissue "T" (FIGS. 8 and 10) grasped between tissue-contacting surfaces 46, 48 of jaw members 42, 44, respectively. The knife tube 62 is operably coupled to a knife drive sub-assembly 300 (FIG. 3) of actuation assembly 100 (FIGS. 2A-2B) at a proximal end thereof to enable the selective actuation of the knife tube 62 to, in turn, reciprocate the knife blade 315 between jaw members 42, 44 to cut tissue "T" (FIGS. 8 and 10) grasped between tissue-contacting surfaces 46, 48. As an alternative to a longitudinally-advanceable mechanical knife, other suitable mechanical cutters are also contemplated, e.g., guillotine-style cutters, as are energy-based cutters, e.g., RF electrical cutters, ultrasonic cutters, etc., in static or dynamic configurations.

Referring still to FIG. 1, a drive rod 484 is operably coupled to cam-slot assembly 52 of end effector assembly 40, e.g., engaged with the cam pin thereof, such that longitudinal actuation of drive rod 484 pivots jaw member 42 relative to jaw member 44 between the spaced-apart and approximated positions. More specifically, urging drive rod 484 proximally pivots jaw member 42 relative to jaw member 44 towards the approximated position while urging drive rod 484 distally pivots jaw member 42 relative to jaw member 44 towards the spaced-apart position. However, other suitable mechanisms and/or configurations for pivoting jaw member 42 relative to jaw member 44 between the spaced-apart and approximated positions in response to selective actuation of drive rod 484 are also contemplated. Drive rod 484 extends proximally from end effector assembly 40 through shaft 30 and into housing 20 wherein drive rod 484 is operably coupled with a jaw drive sub-assembly 400 of actuation assembly 100 (FIGS. 2A-2B) to enable selective actuation of end effector assembly 40 to grasp tissue "T" (FIGS. 8 and 10) therebetween and apply a jaw force within an appropriate jaw force range, as detailed below.

Tissue-contacting surfaces 46, 48 of jaw members 42, 44, respectively, are at least partially formed from an electrically conductive material and are energizable to different potentials to enable the conduction of RF electrical energy through tissue "T" (FIGS. 8 and 10) grasped therebetween, although tissue-contacting surfaces 46, 48 may alternatively be configured to supply any suitable energy, e.g., thermal, microwave, light, ultrasonic, ultrasound, etc., through tissue "T" (FIGS. 8 and 10) grasped therebetween for energy-based tissue treatment. Instrument 10 defines a conductive pathway (not shown) through housing 20 and shaft 30 to end effector assembly 40 that may include lead wires, contacts, and/or electrically-conductive components to enable electrical connection of tissue-contacting surfaces 46, 48 of jaw members 42, 44, respectively, to an energy source (not shown), e.g., an electrosurgical generator, for supplying energy to tissue-contacting surfaces 46, 48 to treat, e.g., seal, tissue "T" (FIGS. 8 and 10) grasped between tissue-contacting surfaces 46, 48.

With additional reference to FIGS. 2A-3, as noted above, actuation assembly 100 is disposed within housing 20 and includes an articulation sub-assembly 200, a knife drive sub-assembly 300, and a jaw drive sub-assembly 400. Articulation sub-assembly 200 is operably coupled between first and second input couplers 110, 120, respectively, of actuation assembly 100 and articulation cables 38 (FIG. 1) such that, upon receipt of appropriate inputs into first and/or second input couplers 110, 120, articulation sub-assembly 200 manipulates cables 38 (FIG. 1) to articulate end effector assembly 40 in a desired direction, e.g., to pitch and/or yaw end effector assembly 40.

Knife drive sub-assembly 300 is operably coupled between third input coupler 130 of actuation assembly 100 and the knife tube such that, upon receipt of appropriate input into third input coupler 130, knife drive sub-assembly 300 manipulates the knife tube to reciprocate the knife blade 315 between jaw members 42, 44 to cut tissue "T" (FIGS. 8 and 10) grasped between tissue-contacting surfaces 46, 48.

Jaw drive sub-assembly 400, as detailed below, is operably coupled between fourth input coupler 140 of actuation assembly 100 and drive rod 484 such that, upon receipt of appropriate input into fourth input coupler 140, jaw drive sub-assembly 400 pivots jaw members 42, 44 between the spaced-apart and approximated positions to grasp tissue "T" (FIGS. 8 and 10) therebetween and apply a jaw force within an appropriate jaw force range.

Actuation assembly 100 is configured to operably interface with a robotic surgical system 1000 (FIG. 4) when instrument 10 is mounted on robotic surgical system 1000 (FIG. 4), to enable robotic operation of actuation assembly 100 to provide the above-detailed functionality. That is, robotic surgical system 1000 (FIG. 4) selectively provides inputs, e.g., rotational inputs to input couplers 110-140 of actuation assembly 100 to articulate end effector assembly 40, grasp tissue "T" (FIGS. 8 and 10) between jaw members 42, 44, and/or cut tissue "T" (FIGS. 8 and 10) grasped between jaw members 42, 44. However, it is also contemplated that actuation assembly 100 be configured to interface with any other suitable surgical system, e.g., a manual surgical handle, a powered surgical handle, etc. For the purposes herein, robotic surgical system 1000 (FIG. 4) is generally described.

Turning to FIG. 4, robotic surgical system 1000 is configured for use in accordance with the present disclosure. Aspects and features of robotic surgical system 1000 not germane to the understanding of the present disclosure are omitted to avoid obscuring the aspects and features of the present disclosure in unnecessary detail.

Robotic surgical system 1000 generally includes a plurality of robot arms 1002, 1003; a control device 1004; and an operating console 1005 coupled with control device 1004. Operating console 1005 may include a display device 1006, which may be set up in particular to display three-dimensional images; and manual input devices 1007, 1008, by means of which a person, e.g., a surgeon, may be able to telemanipulate robot arms 1002, 1003 in a first operating mode. Robotic surgical system 1000 may be configured for use on a patient 1013 lying on a patient table 1012 to be treated in a minimally invasive manner. Robotic surgical system 1000 may further include a database 1014, in particular coupled to control device 1004, in which are stored, for example, pre-operative data from patient 1013 and/or anatomical atlases.

Each of the robot arms 1002, 1003 may include a plurality of members, which are connected through joints, and a mounted device which may be, for example, a surgical tool "ST." One or more of the surgical tools "ST" may be instrument 10 (FIG. 1), thus providing such functionality on a robotic surgical system 1000.

Robot arms 1002, 1003 may be driven by electric drives, e.g., motors, connected to control device 1004. The motors, for example, may be rotational drive motors configured to provide rotational inputs, e.g., to selectively rotationally drive input couplers 110-140 (FIG. 2B) of surgical instrument (FIG. 1) to accomplish a desired task or tasks. Control device 1004, e.g., a computer, may be configured to activate the motors, in particular by means of a computer program, in such a way that robot arms 1002, 1003, and, thus, their mounted surgical tools "ST" execute a desired movement and/or function according to a corresponding input from manual input devices 1007, 1008, respectively. Control device 1004 may also be configured in such a way that it regulates the movement of robot arms 1002, 1003 and/or of the motors.

Control device 1004, more specifically, may control one or more of the motors based on rotation, e.g., controlling to rotational position using a rotational position encoder (or Hall effect sensors or other suitable rotational position detectors) associated with the motor to determine a degree of rotation output from the motor and, thus, the degree of rotational input provided to the corresponding input coupler 110-140 (FIG. 2B) of surgical instrument 10 (FIG. 1). Alternatively or additionally, control device 1004 may control one or more of the motors based on torque, current, or in any other suitable manner.

Figure 5:
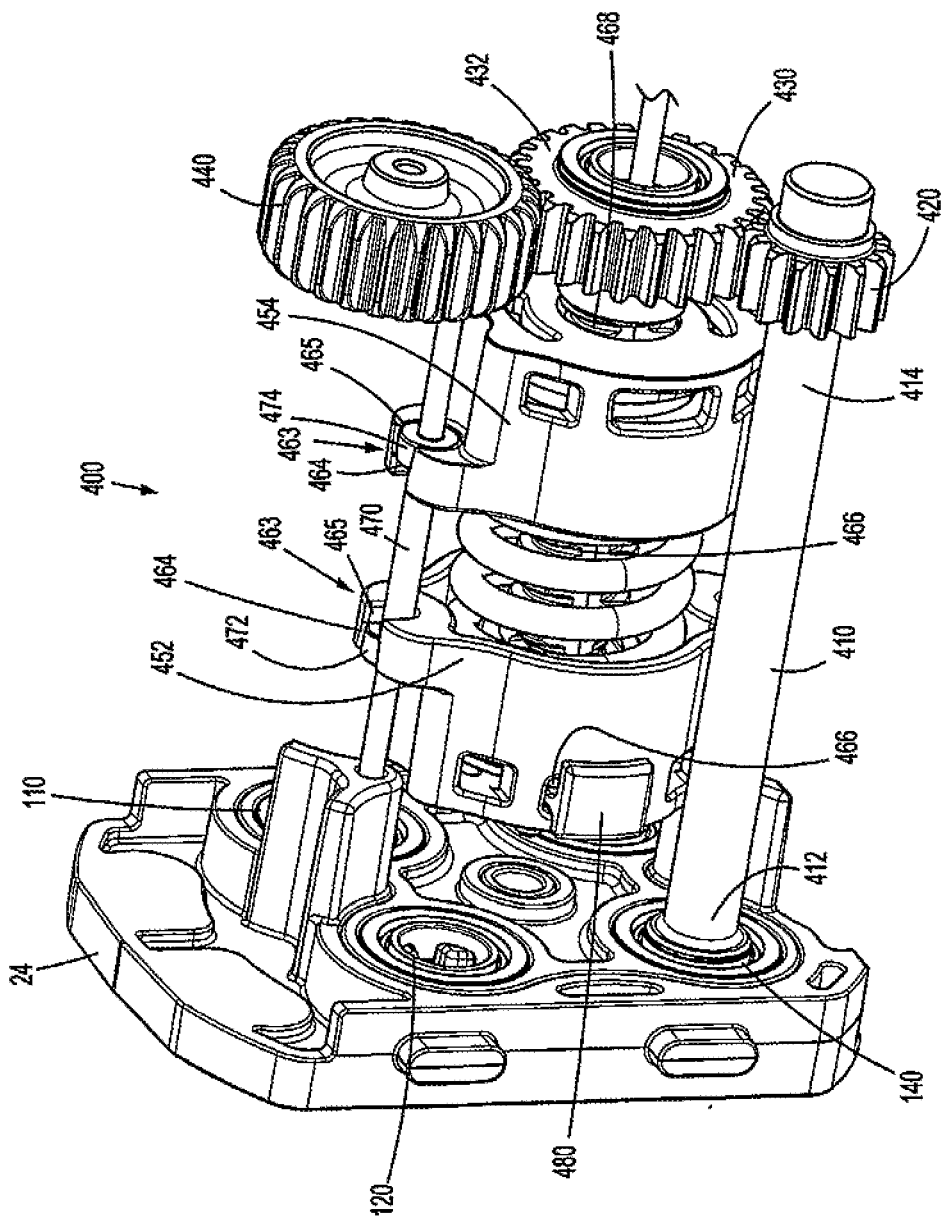
FIG. 5 is a front, perspective view of a jaw drive sub-assembly of the surgical instrument of FIG. 1.
Figure 6:
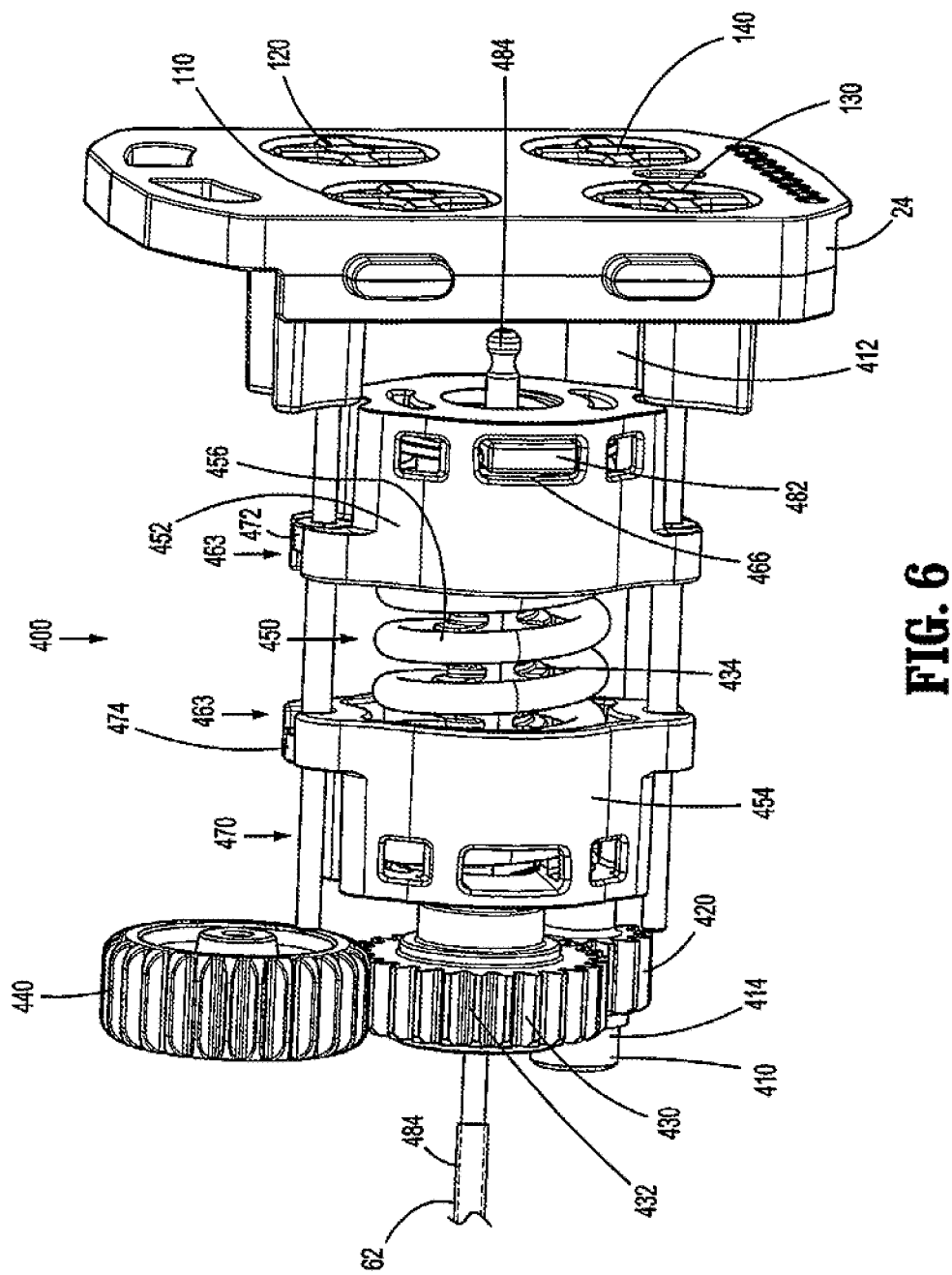
FIG. 6 is a rear, perspective view of the jaw drive sub-assembly of the surgical instrument of FIG. 1.
Figure 7:
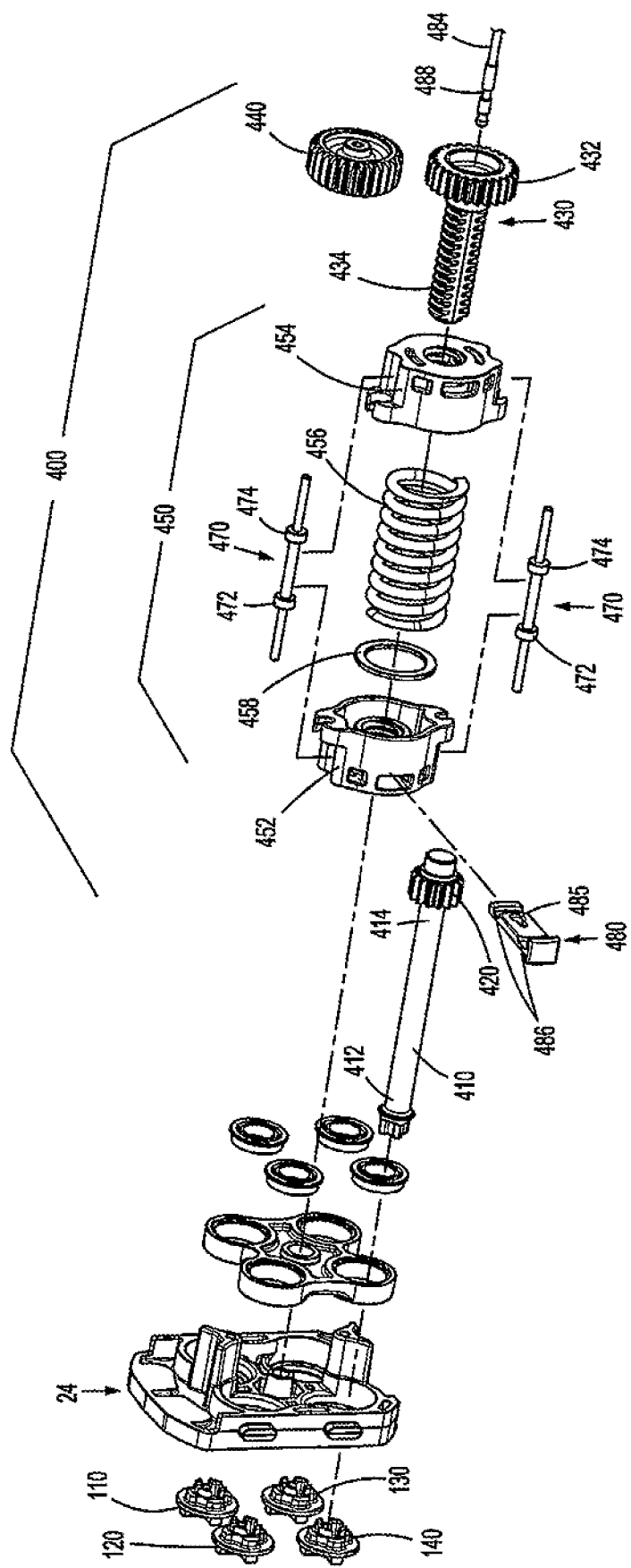
FIG. 7 is an exploded, perspective view of the jaw drive sub-assembly of the surgical instrument of FIG. 1.

With reference to FIG. 5-7, jaw drive sub-assembly 400 of actuation assembly 100 is shown generally including an input shaft 410, an input gear 420, a drive gear 430, a thumbwheel 440, a spring force assembly 450, and a drive rod assembly 480.

Input shaft 410 includes a proximal end portion 412 operably coupled to fourth input coupler 140 and a distal end portion 414 having input gear 420 engaged thereon such that rotational input provided to fourth input coupler 140 drives rotation of input shaft 410 to, thereby, drive rotation of input gear 420. Input gear 420 is disposed in meshed engagement with round gear 432 of drive gear 430 such that rotation of input gear 420, e.g., in response to a rotational input provided at fourth input coupler 140, effects rotation of drive gear 430 in an opposite direction. Thumbwheel 440 is also disposed in meshed engagement with round gear 432 of drive gear 430 such that rotation of thumbwheel 440 effects rotation of drive gear 430 in an opposite direction, thus enabling manual driving of drive gear 430 via manipulation of thumbwheel 440. Drive gear 430, in addition to round gear 432, further includes a lead screw 434 fixedly engaged, e.g., monolithically formed, with round gear 432 such that rotation of round gear 432 effects similar rotation of lead screw 434.

Spring force assembly 450 includes a proximal hub 452, a distal hub 454, a compression spring 456, and a spring washer 458, although suitable force-limiting assemblies are also contemplated such as, for example, utilizing a torsion spring, a compliant feature, etc. Spring force assembly 450 further includes a pair of guide bars 470.

Proximal and distal hubs 452, 454 of spring force assembly 450 may be identical components that are oriented, positioned, and/or coupled to other components differently, thus providing different functionality while reducing the number of different parts required to be manufactured. The features of proximal and distal hubs 452, 454 are detailed below to the extent necessary to facilitate understanding of the present disclosure and, thus, although some features may be detailed with respect to only one of the proximal or distal hub 452, 454 and the function associated therewith, similar features may be provided on the other of the proximal or distal hub 452, 454 without the associated function. Alternatively, proximal and distal hubs 452, 454 may be manufactured as different components.

Proximal and distal hubs 452, 454 of spring force assembly 450 each include a retainer guide 463 extending radially outwardly from opposed sides thereof. Each retainer guide 463 defines a trough 464 and includes a shoulder 465 extending into the respective trough 464. Proximal and distal hubs 452, 454 are oppositely-oriented relative to one another such that the open ends of the cavities defined therein face one another and such that the shoulder 465 of each pair of retainer guides 463 of proximal and distal hubs 452, 454 face away from one another.

Figure 9:
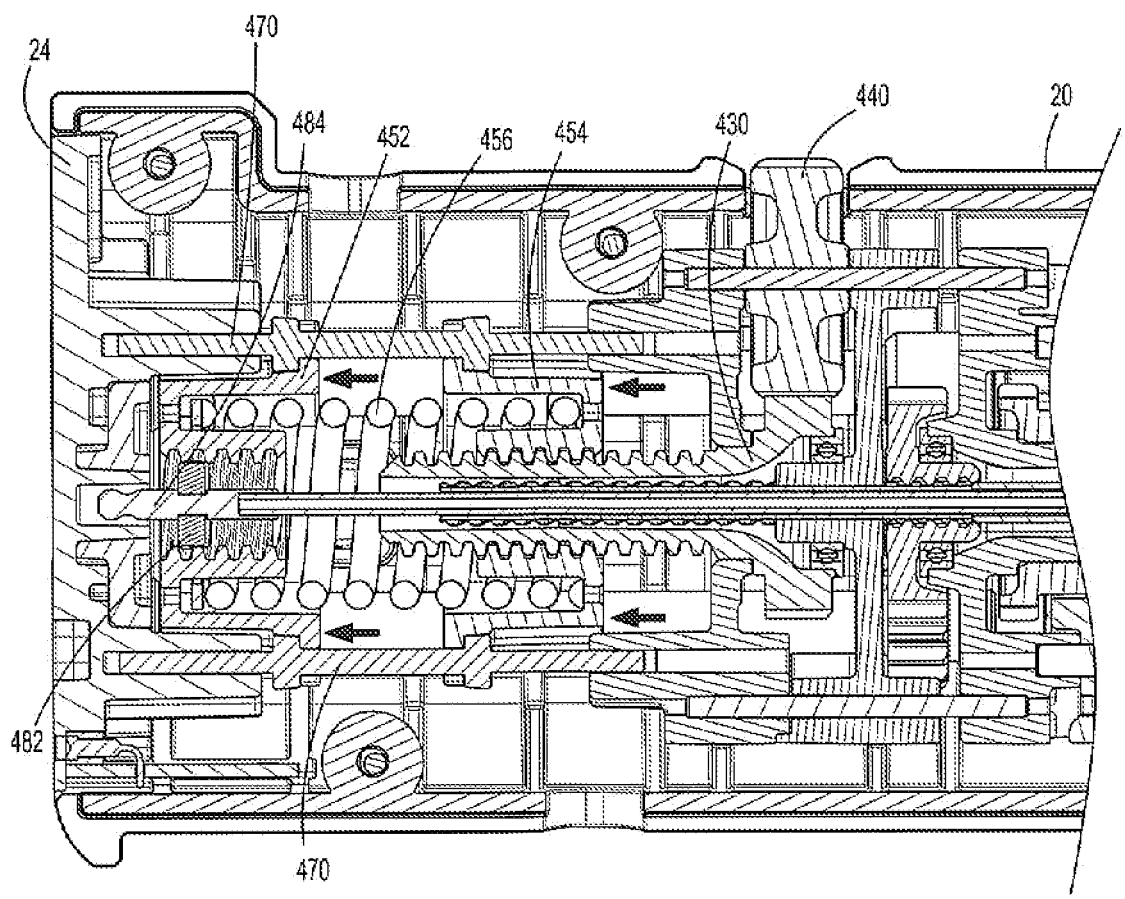
FIG. 9 is a longitudinal, cross-sectional view of a proximal portion of the surgical instrument of FIG. 1 illustrating the jaw drive sub-assembly transitioning the end effector assembly from the open position towards a closed position.
Figure 11:
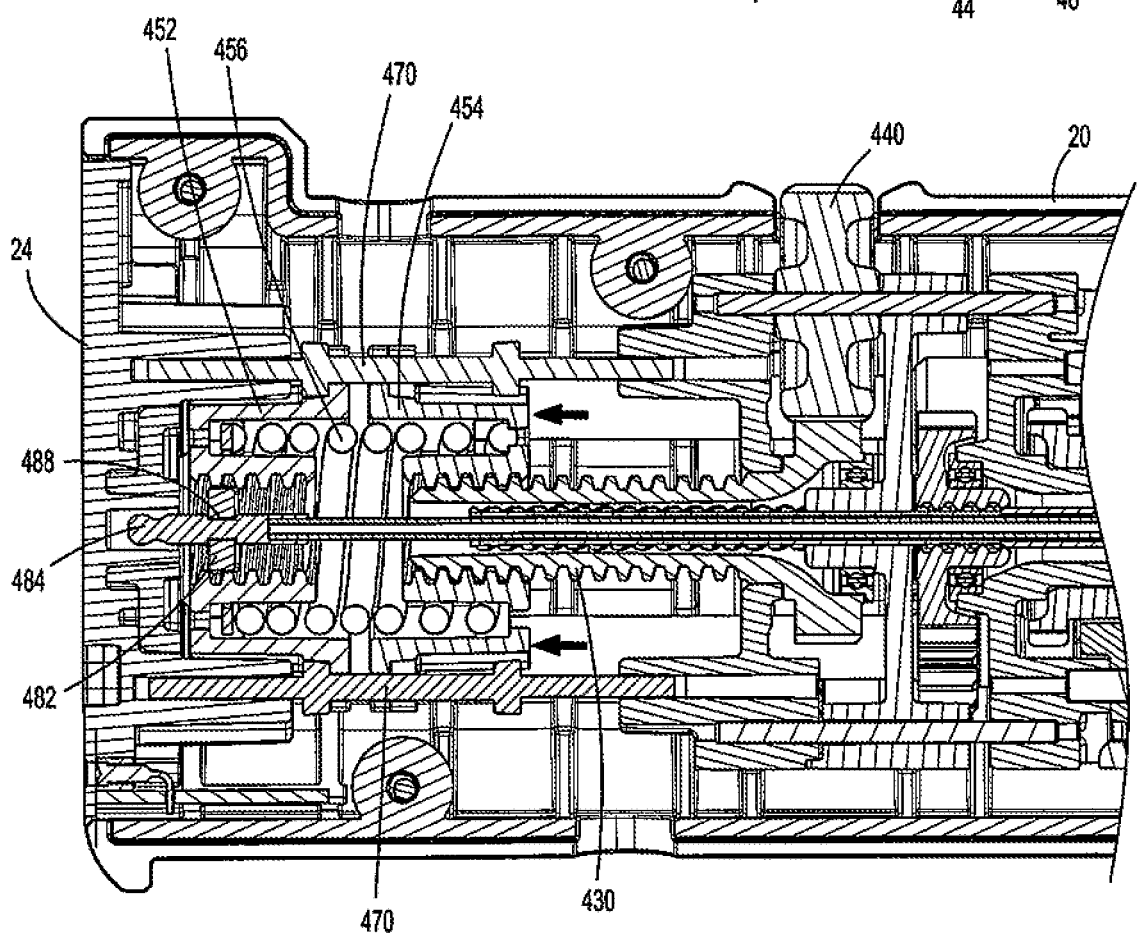
FIG. 11 is a longitudinal, cross-sectional view of the proximal portion of the surgical instrument of FIG. 1 illustrating the jaw drive sub-assembly retaining the end effector assembly in the closed position.

Proximal hub 452 further includes a transverse slot 466 defined therethrough that is configured to receive lock plate 482 of drive rod assembly 480 to fix lock plate 482 and, thus, a proximal end portion of drive rod 484 relative to proximal hub 452 (see FIGS. 9 and 11). Once engaged in this manner, drive rod 484 is locked in position coaxially disposed through proximal hub 452, distal hub 454, compression spring 456, and drive gear 430.

Distal hub 454 defines a threaded central bore 468 extending therethrough. Threaded central bore 468 receives lead screw 434 of drive gear 430 therethrough in threaded engagement therewith such that rotation of lead screw 434 drives translation of distal hub 454 longitudinally along lead screw 434.

Compression spring 456 is disposed between proximal and distal hubs 452, 454 with a proximal portion thereof disposed within the cavity defined within proximal hub 452 and a distal portion thereof disposed within the cavity defined within distal hub 462. At least a portion of compression spring 456 is disposed about and/or configured to receive a portion of lead screw 434 of drive gear 430 therethrough. Spring washer 458 is positioned within the cavity of proximal hub 452 between proximal hub 452 and compression spring 456, although other configurations are also contemplated.

Each guide bar 470 is slidably received within the troughs 464 of the corresponding pair of retainer guides 463 of proximal and distal hubs 452, 454. Each guide bar 470 includes a pair of spaced-apart rims 472, 474 engaged thereon that are configured to abut shoulders 465 of the respective retainer guides 463, thereby defining a maximum distance between proximal and distal hubs 452, 454. However, proximal and/or distal hubs 452, 454 are permitted to slide along guide bars 470 towards one another, as detailed below.

Continuing with reference to FIGS. 5-7, drive rod assembly 480 includes lock plate 482 and drive rod 484. Lock plate 482 defines a central keyhole 485 and a pair of slots 486, e.g., arcuate slots, defined on a distal face of lock plate 482 on either side of central keyhole 485. Lock plate 482 is configured for insertion through transverse slot 466 of proximal hub 452 and, once installed therein, portions of spring washer 458 are configured for receipt within slots 486 to secure lock plate 482 in engagement within proximal hub 452. Spring washer 458 is maintained in position within slots 486 under the bias of compression spring 456 which, at the maximum distance between proximal and distal hubs 452, 454 (as set by rims 472, 474 of guide bars 470 and shoulders 465 of retainer guides 463), is pre-compressed.

Drive rod 484, as noted above, includes a distal end portion operably coupled to cam-slot assembly 52 of end effector assembly 40 (FIG. 1). Drive rod 484 extends proximally through shaft 30, housing 20, and actuation assembly 100 (see FIGS. 1-3) and is engaged within lock plate 482 at a proximal end portion of drive rod 484. More specifically, drive rod 484 defines a waist 488 towards the proximal end thereof that is configured to lock in engagement within central keyhole 485 of lock plate 482, e.g., via longitudinal translation of drive rod 484 into central keyhole 485 until waist 488 is aligned with central keyhole 485, followed by transverse movement of drive rod 484 relative to lock plate 482, to thereby fix the proximal end portion of drive rod 484 relative to lock plate 482 and, thus, relative to proximal hub 452 due to the engagement of lock plate 482 within proximal hub 452.

Referring to FIGS. 8-11, in use, jaw members 42, 44 are initially disposed in the spaced-apart position (FIG. 8) and, correspondingly, proximal and distal hubs 452, 454 are disposed in a distal-most position such drive rod 484 is disposed in a distal-most position (FIG. 9). Further, in this position, compression spring 456 is disposed in a least-compressed condition; although, as noted above, even in the least-compressed condition, compression spring 456 is partially compressed due to the retention of compression spring 456 in a pre-compressed configuration between proximal and distal hubs 452, 454.

Figure 8:
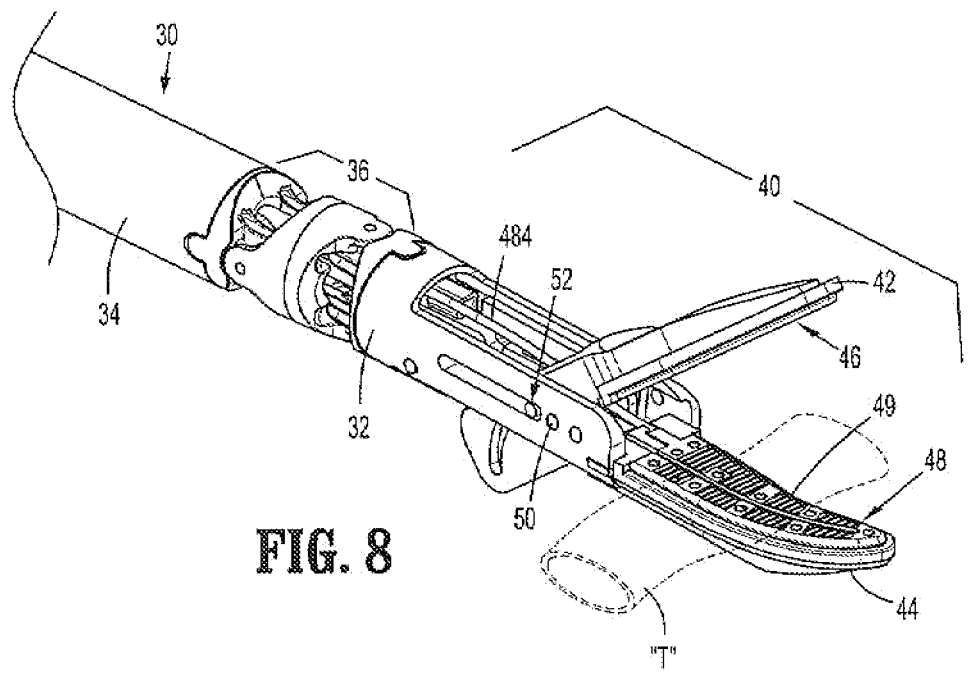
FIG. 8 is a perspective view of a distal portion of the surgical instrument of FIG. 1 with the end effector assembly disposed in an open position.
Figure 10:
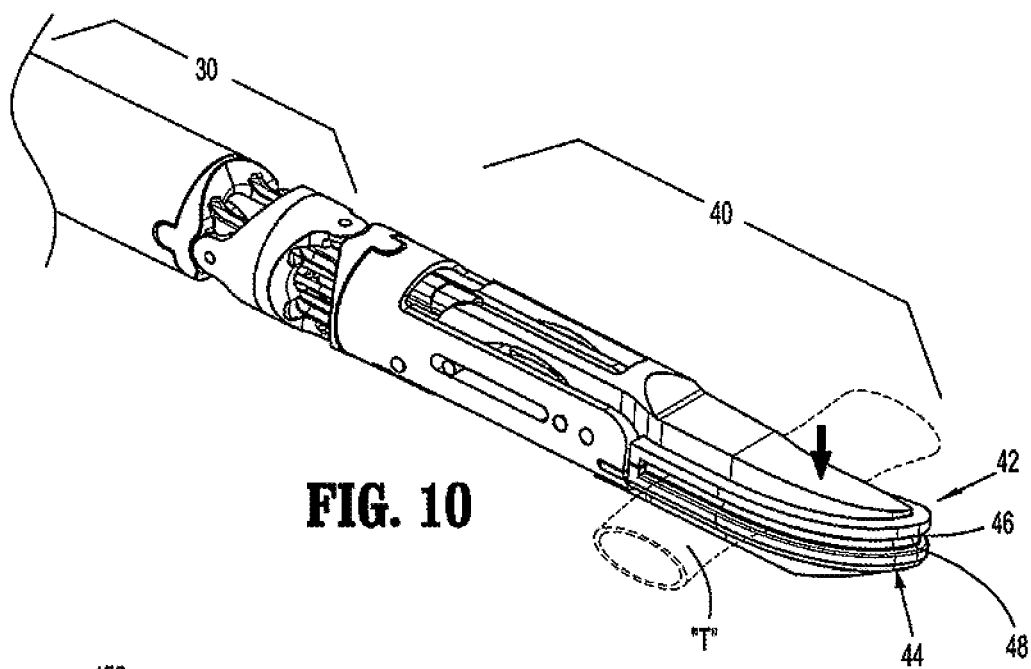
FIG. 10 is a perspective view of the distal portion of the surgical instrument of FIG. 1 with the end effector assembly disposed in the closed position.

In response to an input to close end effector assembly 40, e.g., rotational input by the corresponding motor of robotic surgical system 1000 (FIG. 4) to fourth input coupler 140 (FIGS. 5-7), drive shaft 410 is rotated to thereby rotate input gear 420 which, in turn, rotates drive gear 430 such that distal hub 454 is translated proximally towards proximal hub 452 (see FIG. 9). Proximal translation of distal hub 454 urges distal hub 454 against compression spring 456. Initially, where forces resisting approximation of jaw members 42, 44 are below a threshold corresponding to the spring value of compression spring 456, the jaw force applied by jaw members 42, 44 is relatively low such that the urging of distal hub 454 proximally against compression spring 456 urges compression spring 456 proximally which, in turn, urges lock plate 482 and, thus, drive rod 484 proximally to pivot jaw member 42 relative to jaw member 44 from the spaced-apart position towards the approximated position to grasp tissue "T" therebetween (FIGS. 8 and 10).

Upon further approximation of jaw members 42, 44 to grasp tissue "T" therebetween, the forces resisting approximation of jaw members 42, 44, e.g., tissue "T" resisting compression, may reach the threshold and, thus the jaw force applied by jaw members 42, 44 may reach a corresponding threshold. In order to maintain the jaw force applied by jaw members 42, 44 within a jaw force range such as, for example, from about 3 kg/cm$^2$ to about 16 kg/cm$^2$, application of further jaw force by jaw members 42, 44 is inhibited beyond the threshold point despite further rotational input to fourth input coupler 140 (FIGS. 5-7). More specifically, once the threshold has been reached, further rotational input to fourth input coupler 140 (FIGS. 5-7) rotates drive shaft 410, input gear 420, and drive gear 430 to translate distal hub 454 further proximally into compression spring 456. However, rather than compression spring 456 urging proximal hub 452 further proximally to continue approximation of jaw members 42, 44 and increase the closure force applied therebetween, compression spring 456 is compressed, enabling proximal hub 452 and, thus, drive rod 484 to remain in position, thus inhibiting application of additional jaw force between jaw members 42, 44 (see FIGS. 10 and 11).

With tissue "T" grasped between jaw members 42, 44 under an appropriate jaw force, energy may be supplied to jaw members 42, 44 to treat, e.g., seal tissue "T." Thereafter, the knife blade 315 may be advanced between jaw members 42, 44 to cut the treated tissue "T," e.g., by providing a rotational input to input coupler 130 (FIG. 6) to actuate knife drive sub-assembly 300 to translate the knife tube distally to thereby advance the knife blade 315 between jaw members 42, 44 to cut the treated tissue "T." Alternatively, tissue "T" may be cut without first treating the tissue "T" and/or tissue "T" may be treated without subsequent cutting.

Once tissue "T" is cut, an opposite rotation input is provided to input coupler 130 (FIG. 6) to return the knife blade 315 to its initial position proximally of body portions 43*b*, 45*b* of jaw members 42, 44 (see FIG. 1). Thereafter, an opposite input is provided to input coupler 140 (FIGS. 5-7) to return jaw members 42, 44 back towards the spaced-apart position to release the sealed and/or cut tissue.

Referring generally to FIGS. 1-11, as detailed above, calibration information, setting information, use information, and adjustment information, among other information, are stored in the storage device of electronics 92 of instrument 10, in robotic surgical system 1000 (FIG. 4), and/or in other accessible storage devices. The calibration information may include an algorithm(s), set point(s), look-up table(s), machine learning program(s), and/or other information to enable determination of home/initial positions of the various components of instrument 10 such as, for example: the open position of jaw members 42, 44, the retracted position of the knife blade 315, the un-articulated configuration of shaft 30 and end effector assembly 40, etc.

The setting information may include, for example, jaw drive information, e.g., a degree of rotational input to input coupler 140 required to move jaw members 42, 44 from the open position towards the closed position to grasp tissue "T" between tissue-contacting surfaces 46, 48 and apply a jaw force or jaw force within a jaw force range thereto; knife deployment information, e.g., a degree of rotational input to input coupler 130 required to deploy the knife blade 315 from the retracted position to an extended position to cut tissue "T" between tissue-contacting surfaces 46, 48; and/or articulation control information, e.g., a degree of rotational input to input couplers 110 and/or 120 required to articulate end effector assembly 40 from the un-articulated position to one or more articulated positions (for example, a maximum positive yaw position, a maximum negative yaw position, a maximum positive pitch position, and a maximum negative pitch position); etc. The setting information may be determined based on testing during manufacturing (e.g., for each instrument, each unit of instruments, or for all instruments), may be determined via mathematical simulation, utilizing machine learning, using theoretical formulae, combinations thereof, etc.

The use information may include, for example, a number of connections to a robotic surgical system, elapsed time of use/connection, elapsed idle time, elapsed time of active use, age (time since manufacture), number of jaw member approximations, number of energy activations, number and/or manner of articulations, number of knife blade 315 deployments, etc. Robotic surgical system 1000 may write and/or update the use information stored in the storage device 92 of instrument 10 (and/or elsewhere) periodically, continuously, upon occurrence of an event, or in any other suitable manner.

Some or all of the setting information may be basis information that can be adjusted periodically, continuously, upon occurrence of certain events, and/or based on external inputs (user-provided input, sensor or other component feedback, etc.). For example, the basis setting information may be adjusted, e.g., at robotic surgical system 1000, based upon one or more current conditions of the instrument 10 and/or the current use information, as indicated by the adjustment information. The adjustment information for each corresponding setting may include an algorithm(s), set point(s), look-up table(s), machine learning program(s), etc. The adjustment information may be determined experimentally, via mathematical simulation, utilizing machine learning, using theoretical formulae, combinations thereof, etc.

By way of example, the jaw drive setting information may provide basis information indicating that "X" degrees of rotational input to input coupler 140 is required to move jaw members 42, 44 from the open position towards the closed position to grasp tissue "T" between tissue-contacting surfaces 46, 48 and apply a jaw force or jaw force within a jaw force range thereto. Thus, in the absence of modification to this jaw drive setting information, upon receiving a signal to approximate jaw members 42, 44 to grasp tissue between tissue-contacting surfaces 46, 48 for tissue treatment, e.g., sealing, control device 1004 controls the appropriate motor(s) of robotic surgical system 1000 to impart "X" degrees of rotational input to input coupler 140 such that tissue-contacting surfaces 46, 48 grasp tissue "T" therebetween under the applied jaw force or jaw force within the jaw force range.

However, it has been found that the jaw force or jaw force range applied in response to input of a set degree of rotational input to input coupler 140 may vary over the usable life of instrument 10 and/or based upon a current condition of instrument 10, e.g., whether end effector assembly 40 is disposed in an un-articulated position, partially articulated position, or fully articulated position. The stage of useable life of instrument 10 may be determined based upon some or all of the above-noted use information and may affect the jaw force or jaw force range due to, for example, changes in component stiffness/elasticity, establishment of "memory" positions of components/connections, changes in force transmission across joints/connections, changes in tolerances, changes in frictional loss, component wear, component and/or joint/connection degradation, etc. The current condition of instrument 10 may be determined by control device 1004 and/or other components of robotic surgical system 1000 based upon feedback data, previous inputs, visual or other tracking information, etc., and may affect the jaw force or jaw force range due to actuation force changes, actuation distance changes, friction changes, etc.

In order to account for the above changes, the adjustment information enables adjustment of the basis jaw drive setting, e.g., "X" degrees, to an adjusted jaw drive setting, e.g., "Y" degrees, based upon the use and/or current condition of instrument 10 using the algorithm(s), set point(s), look-up table(s), machine learning program(s), etc. As such, with the adjusted jaw drive setting information implemented, upon receiving a signal to approximate jaw members 42, 44 to grasp tissue between tissue-contacting surfaces 46, 48 for tissue treatment, e.g., sealing, control device 1004 controls the appropriate motor(s) of robotic surgical system 1000 to impart "Y" degrees of rotational input to input coupler 140 such that tissue-contacting surfaces 46, 48 grasp tissue "T" therebetween under the applied jaw force or jaw force within the jaw force range. Thus, the same jaw force or jaw force range is achieved despite changing input requirements.

The present disclosure, however, is not limited to adjusting jaw drive setting information for applying jaw force but, rather, may apply to adjustment of any other suitable setting information, e.g., knife deployment information, articulation control information, etc. Further, the present disclose is not limited to instrument 10 but may also apply to any other suitable surgical instrument. Indeed, the methods provided in accordance with the present disclosure and detailed below with reference to FIGS. 12 and 13 may be utilized with instrument 10 for adjusting jaw drive setting information or may be utilized with any other suitable instrument and/or desired manipulation thereof.

Figure 12:
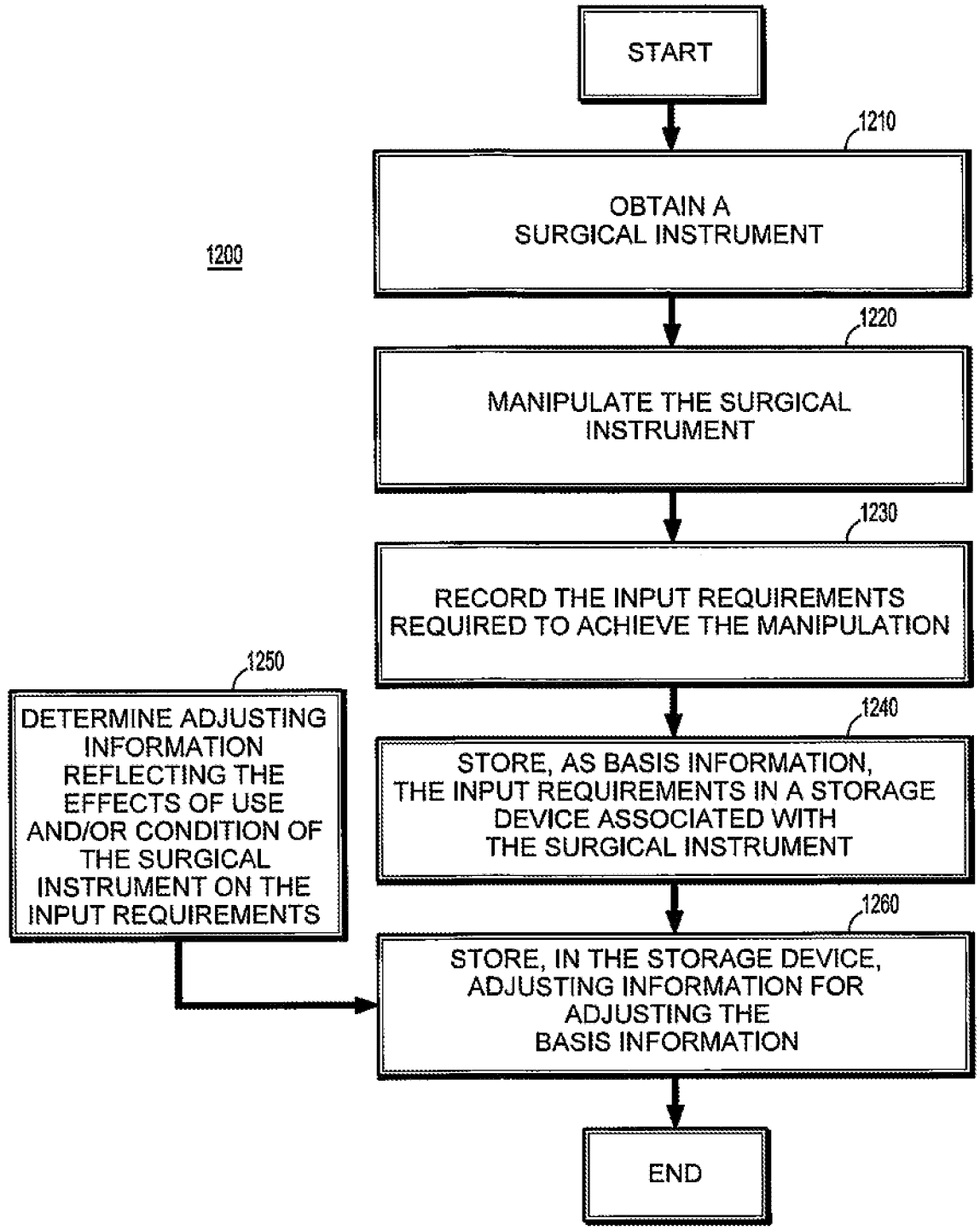
FIGS. 12 and 13 are flow diagrams illustrating methods provided in accordance with the present disclosure.

Turning to FIG. 12, a testing and/or manufacturing method 1200 is provided. Although reference is made hereinbelow to a/the "surgical instrument," it is understood that method 1200 may be performed on one or more surgical instruments for implementation on one or more groups of surgical instruments. Likewise, although reference hereinbelow is made to a/the "storage device," it is understood that method 1200 may be performed using various separate storage media associated with one or more surgical instruments or groups thereof.

Initially, at 1210, a surgical instrument is obtained, e.g., off the manufacturing line, for testing, etc. The surgical instrument is loaded into a test fixture or other suitable test device and, at 1220, is manipulated in a particular manner. The manipulation may include, for example, approximating the jaw members from the open position towards the closed position to achieve a pre-determined jaw force (as measured by the test fixture) and/or pre-determined gap distance between the tissue-contacting surfaces thereof, articulating the end effector assembly a pre-determined amount in a pre-determined direction, deploying the knife blade 315 from the retracted position to the extended position, etc. The input requirements for achieving the manipulation are recoded at 1230. These input requirements are then stored, at 1240, as basis information in a storage device associated with the surgical instrument (e.g., a storage device of the surgical instrument or accessible in conjunction with use of the surgical instrument). The basis information may be the input requirements themselves (e.g., a required rotational input to achieve the manipulation), and/or may include information to enable determination of an input requirement based thereon (e.g., a ratio or formula of the effect of a rotational input towards a desired manipulation to enable use of the basis information for manipulations of varying degree (partially articulated vs full articulated, for example)).

Adjusting information reflecting the effects of use and/or condition of the surgical instrument on the input requirements is determined at 1250 such as, for example, experimentally, via simulation, obtained from other instruments/system, or in any other suitable manner. This adjusting information is likewise stored in the storage device, at 1260. Thus, the surgical instrument is equipped with setting information as well as information to enable adjustment thereof based upon use and/or condition of the surgical instrument. Accordingly, when implemented for use in a surgical procedure, the stored information can be accessed to enable accurate manipulation throughout the useful life of the instrument and in different conditions of the instrument without requiring user input or instrument modification.

Figure 13:
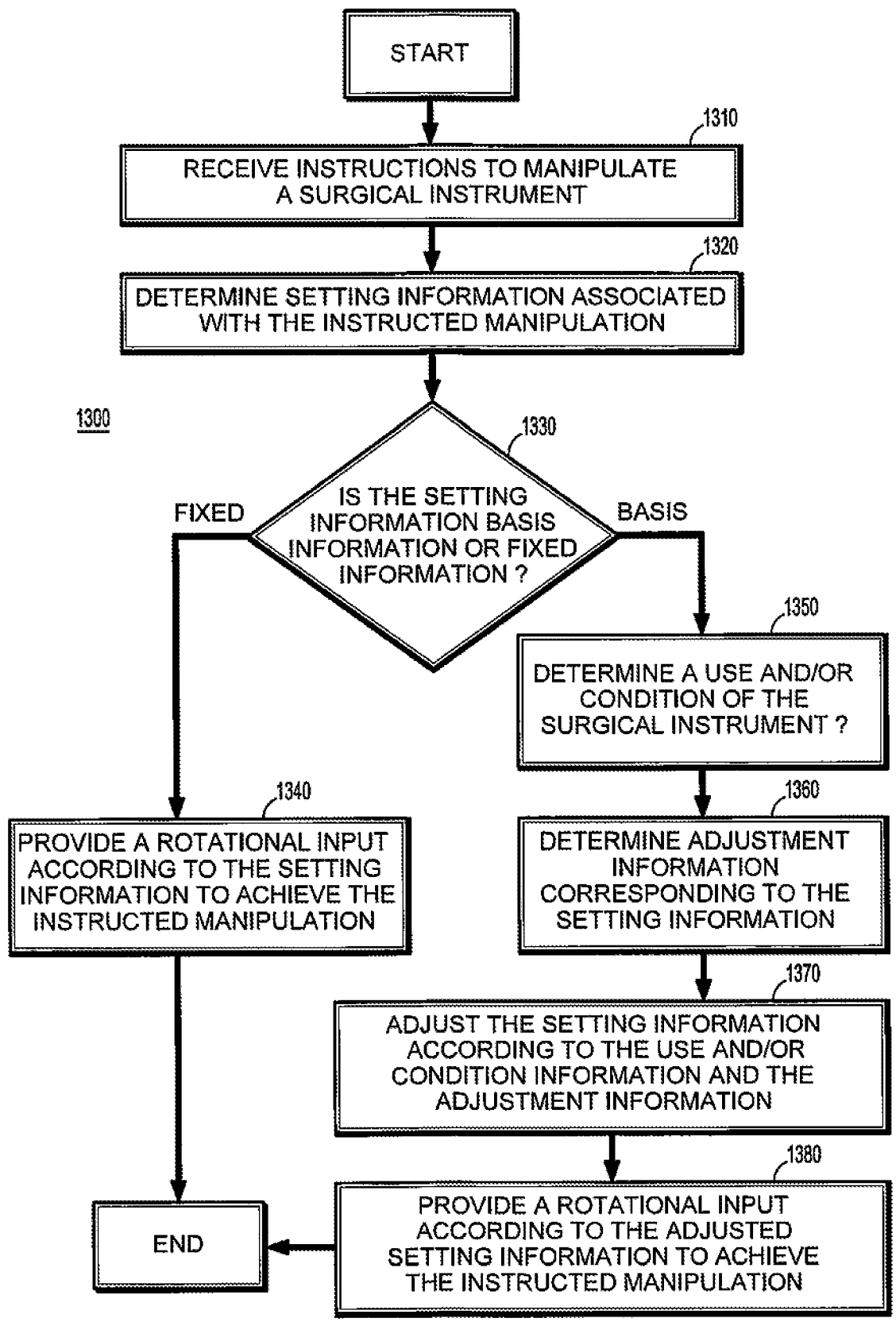

With reference to FIG. 13, a method 1300 of operating a surgical system, e.g., a robotic surgical system, is provided. Initially, at 1310, instructions are received to manipulate a surgical instrument. The instructions may be user input, e.g., via actuation of appropriate mechanical and/or electrical actuators, User Interface (UI) commands, voice commands, etc. or automatic, e.g., based upon feedback, sensed conditions, etc. The manipulation may include, for example, approximating the jaw members from the open position towards the closed position to apply a jaw force suitable for tissue treatment and/or achieve a gap distance between the tissue-contacting surfaces thereof suitable for tissue treatment, articulating the end effector assembly to a desired position, deploying the knife blade 315 from the retracted position to the extended position to cut tissue, etc.

In response to receipt of the instructions, setting information associated with the instructed manipulation is determined at 1320. This setting information may be determined via accessing such information from a storage device associated with the surgical instrument or in any other suitable manner, and may include, for example, a degree of rotational input required to achieve the desired manipulation or information from which the degree of rotational input can be computed, for example.

At 1330, it is determined whether the setting information is basis information of fixed information. If fixed information, meaning the setting information is not subject to adjustment, the setting information is used to provide a rotational input to the surgical instrument to achieve the instructed manipulation. On the other hand, if the setting information is basis information, meaning the setting information is subject to adjustment, a use and/or condition of the surgical instrument is determined at 1350 and adjustment information corresponding to the setting information is determined at 1360. 1350 and 1360 may be performed in any suitable order or simultaneously. The use and/or condition of the surgical instrument may be determined by accessing stored information, based upon feedback data, previous inputs, visual or other tracking information, etc. The adjustment information may be determined by accessing stored information or in any other suitable manner.

Based upon the use and/or condition information and the adjustment information, the setting information is adjusted, if necessary, at 1370. The adjusted setting information is utilized, at 1380 to provide a rotational input to the surgical instrument to achieve the instructed manipulation. Thus, when an instruction to manipulate the surgical instrument is received, the appropriate rotational (or other suitable input) to provide the manipulation is determined, thus accounting for changes of input requirements throughout the useful life of the instrument and in different conditions of the instrument and without requiring user input or instrument modification.

It should be understood that various aspects disclosed herein may be combined in different combinations than the combinations specifically presented hereinabove and in the accompanying drawings. In addition, while certain aspects of the present disclosure are described as being performed by a single module or unit for purposes of clarity, it should be understood that the techniques of this disclosure may be performed by a combination of units or modules associated with, for example, a surgical system.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structures or any other physical structure suitable for implementation of the described techniques. Also, the techniques could be fully implemented in one or more circuits or logic elements.

Figure 14:
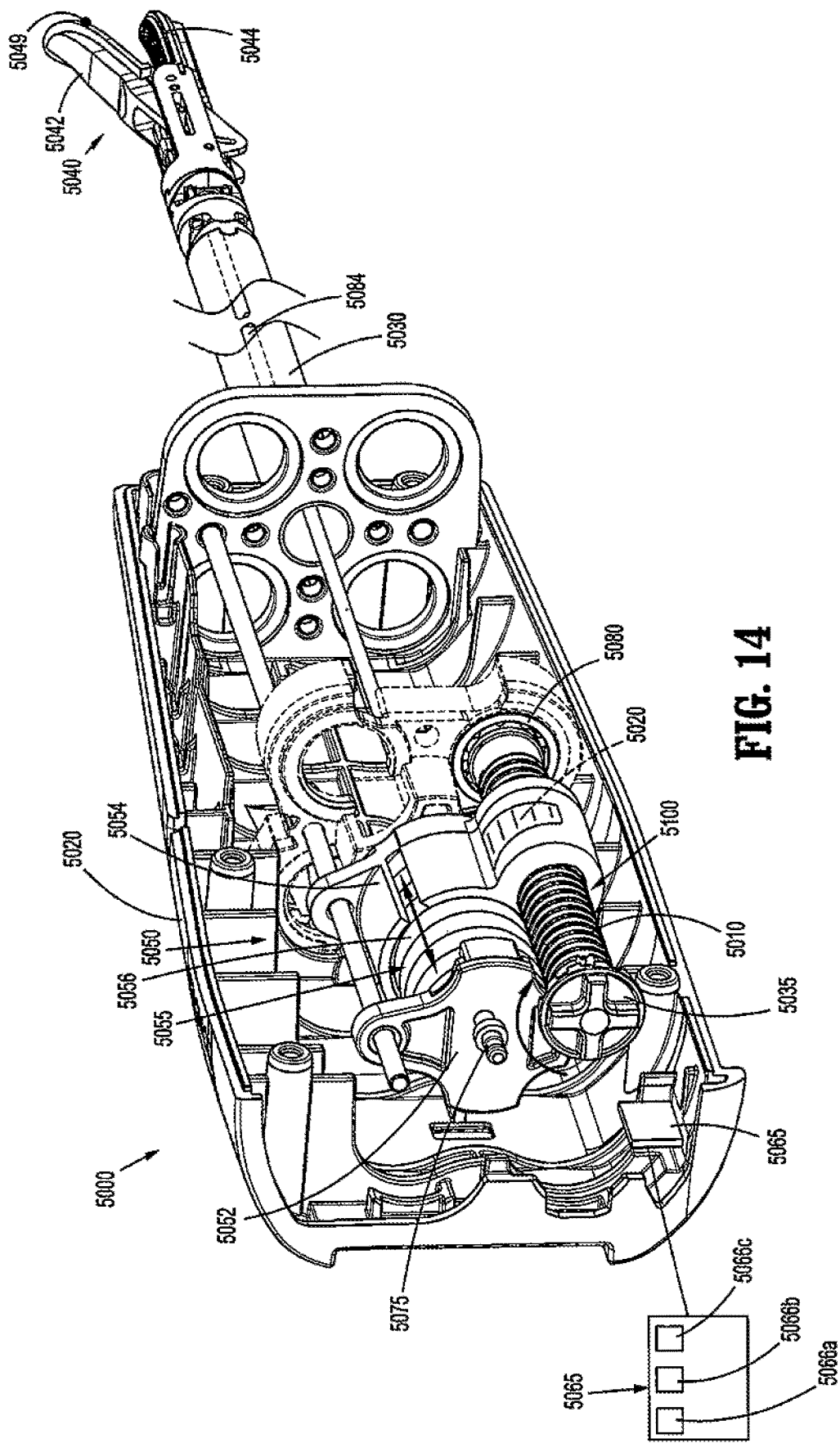
FIG. 14 is a rear perspective view of another embodiment according to the present disclosure.

FIG. 14 shows another embodiment of a robotic surgical instrument 5000 in accordance with the present disclosure which generally includes a housing 5020, a shaft 5030 extending distally from housing 5020, an end effector assembly 40 (FIG. 1), an actuation assembly 5100 disposed within housing 5020 and operably associated with shaft 5030 and configured to actuate the end effector assembly 5040. Instrument 5000 is detailed herein as an articulating electrosurgical forceps configured for use with a robotic surgical system, e.g., robotic surgical system 500 (FIG. 3). However, the aspects and features of instrument 5000 provided in accordance with the present disclosure, detailed below, are equally applicable for use with other suitable surgical instruments and/or in other suitable surgical systems.

Generally, with traditional surgical forceps utilized for sealing tissue, a handle assembly cooperates with to drive assembly to actuate the jaw members of an end effector for sealing tissue. More particularly, a handle is moved or squeezed relative to the instrument housing which, in turn, compresses a spring associated with the drive assembly to actuate a drive rod to close the jaw members about tissue under a predetermined force. Factors such as spring rate, spring compression distance, jaw shape, handle shape, handle rotation, moment arc and closure distance, shaft force are all factors that are carefully controlled to insure that when the handle is fully compressed the pressure between the jaw members falls within the range of about 3 kg/cm² to about 16 kg/cm².

Eliminating the handle and the other factors associated therewith, e.g., arc, rotation and moment, and knowing the shaft force and jaw shape greatly simplifies the factors needed to insure the appropriate closure pressure for sealing tissue. Manufacturing an instrument eliminating or knowing these factors simplifies the actuation of the drive assembly to compress a spring with a known spring rate a preset distance to achieve the necessary closure pressure between the jaw members.

FIG. 14 is an internal view of a compression assembly 5055 configured to house the spring force assembly 5050 and the jaw drive assembly 5005 including the jaw input gear 5022 operably coupled to the jaw drive input 5035. Spring force assembly 5050 includes a distal hub 5054, a proximal hub 5052, a drive gear (e.g., drive gear 430 of FIG. 3) and a locking tab 5075. Each hub 5052, 5054 includes an inner peripheral surface having a plurality of teeth, respectively, configured to matingly engage a corresponding plurality of teeth or threads of the drive gear 430.

Actuation of the jaw drive input 5035 rotates the jaw drive input shaft 5010 which, in turn, rotates the jaw input gear 5022 which couples to the drive gear 430. Rotation of the drive gear 430 forces the proximal hub 5052 of the spring force assembly 5050 to linearly translate against the bias of the compression spring 5056 relative to the distal hub 5054 which, in turn, linearly translates the jaw drive rod 5084 by virtue of the mechanical engagement of the proximal end of the jaw drive rod 5084 and the locking tab 5075. The jaw members 5042, 5044 are opened and closed as needed through this arrangement of mechanically cooperating components. A hard stop 5080 may be placed atop the jaw drive input shaft 5010 to prevent the distal hub 5054 from moving too far distally and just prior to the jaw drive rod 5084 bottoming out in a cam slot (not shown) of each respective jaw member 5042, 5044. In addition, the distal hub 5054 hitting the hard stop 5080 will quickly generate a high torque condition (as explained in detail below) connoting that the jaw members 5042, 5044 are fully open.

It is known that rotating the jaw drive input 5035 via a robotic drive controller, e.g., robotic drive controller 1005 (FIG. 3), until it reaches a predetermined torque and using that torque to calculate (or correlate to) the closure pressure between jaw members 5042, 5044 is one way to determine the pressure therebetween. However, this method may not yield the required consistency needed for sealing tissue or may not yield the required consistency over prolonged use.

Forceps 5000 utilizes a similar concept to a pistol-grip handle approach and relies solely on compressing a spring with a known spring constant a preset distance to accurately and consistently achieve the desired closure pressure for sealing tissue within the above-identified range, 3 kg/cm² to about 16 kg/cm². With a spring force assembly 5050, the repeatability and consistency of the closure force of the spring 5056 is assured even during heating, desiccation and shrinkage of tissue during the sealing process. More particularly, once the jaw members 5042, 5044 are moved to a fully open or home position, the jaw drive 5035 rotates the jaw drive input shaft 5010 and jaw drive gear 5022 a preset number of degrees, e.g., 1500 degrees, which, in turn, consistently approximates the jaw members 5042, 5044 to within the necessary closure pressure range. The number of degrees of rotation is typically dependent on the type of spring, spring constant, size of jaw drive input shaft 5035, thread ratio of the jaw drive input shaft 5035 etc. These and other parameters are associated with the manufacturer's specifications of the jaw drive input 5035 (and components associated therewith) and spring assembly 5055 (and components associated therewith). A robotic drive input controller 5065 may be operably disposed in the housing 5020 (or robotic drive input controller 1004 of FIG. 3) and configured to maintain the rotational orientation (e.g., degree of rotation) of the jaw drive input shaft 5010 during use allowing repeated and consistent approximation of the jaw members 5042, 5044 within the sealing range over prolonged usage.

If a new end effector 5040 is attached to the forceps 5000, the new jaw members 5042, 5044 are simply moved to the fully opened or home position such that the same number of degrees of rotation will approximate the jaw members 5042, 5044 within the sealing range. In other words, other than determining the fully opened or home position of the jaw members 5042, 5044 via manually or utilizing a homing algorithm (described below), the degrees of rotation of the jaw drive input shaft 5010 remains constant for each subsequent end effector 5040 eliminating the need to individually calibrate the jaw drive input 5035 for each subsequent end effector 5040.

The present disclosure also relates to a method of providing a consistent sealing pressure between the jaw members 5042, 5044 of an end effector assembly 5040 of a robotic surgical forceps 5000. The method includes selectively engaging an end effector 5040 (or end effector 5040 and shaft 5030) onto a housing 5020 of a robotic surgical forceps 5000 and coupling the end effector 5040 to an actuation assembly 5100. Manually or automatically opening a pair of jaw members 5042, 5044 of the end effector assembly 5040 to a fully open position. Actuating the jaw drive input 5035 to rotate the jaw drive input shaft 5010 a preset number of degrees, e.g., about 1500 degrees to about 3000 degrees (or equivalent radians), to close one or both of the jaw members, e.g., jaw member 5042, relative to the other jaw member, e.g., jaw member 5044, under a closure pressure within the range of about 3 kg/cm$^2$ to about 16 kg/cm$^2$. The method may include the step of placing tissue between the jaw members 5042, 5044 prior to actuating the jaw drive input 5035.

The step of manually opening the pair of jaw members 5042, 5044 may include actuating the jaw drive input 5035 to open the jaw members 5042, 5044 to a visibly fully open position or using some sort of automatic or mechanical stop 5049 to visually, audibly or tactilely indicate the fully open jaw position. Automatically opening the jaw members 5042, 5044 to a fully open position may include one or more algorithms associated with a PCB 5066a and/or EPROM associated with a position sensor(s) 5066b, torque sensor 5066c, and/or other known types of sensors (FIG. 14).

Figure 16:
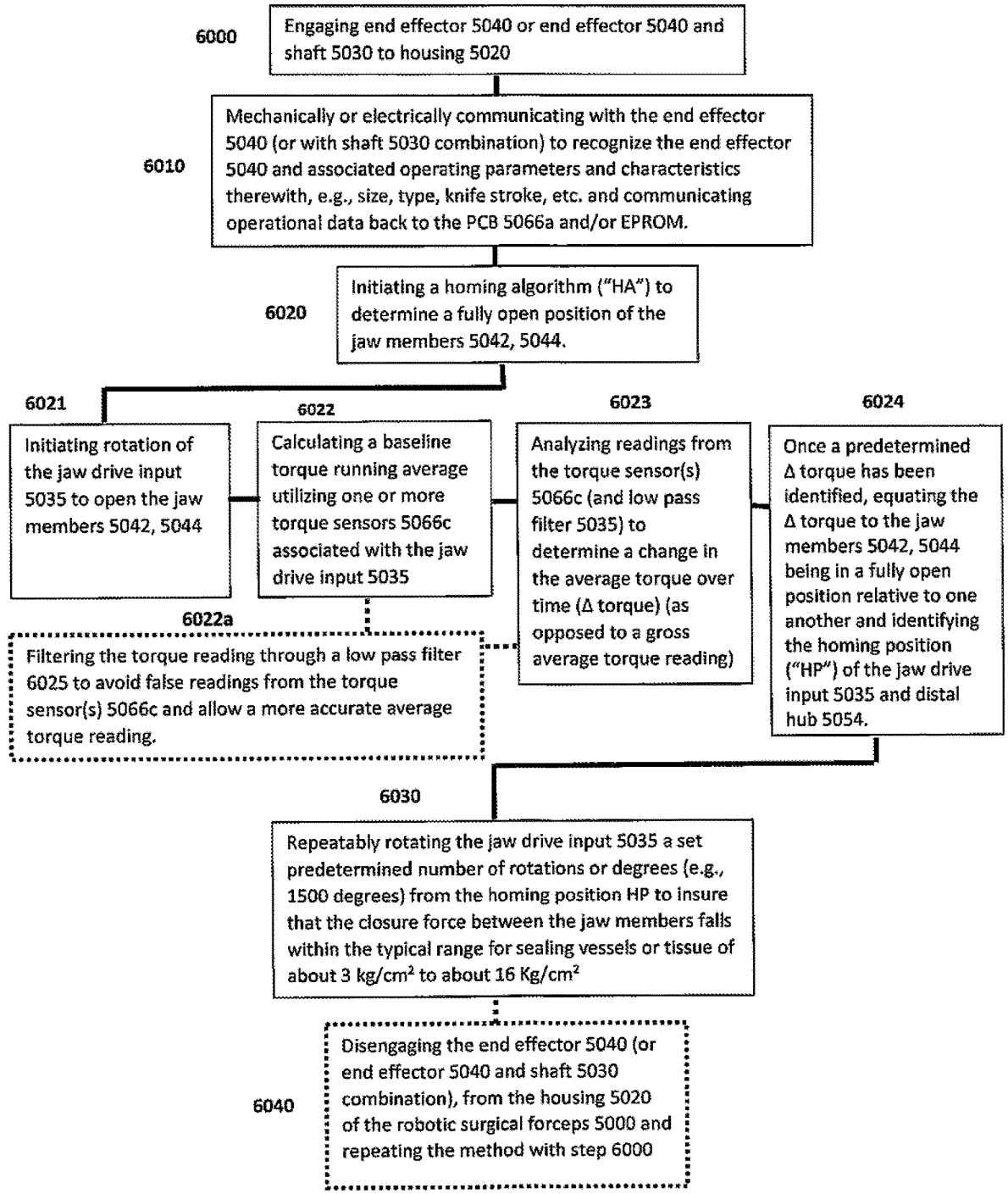
FIG. 16 is a flow diagram illustrating a method for determining a homing position of a pair of jaw members for use with the presently disclosed robotic surgical instrument.

Turning now to FIG. 16 which shows a method for providing consistent jaw closure force including a homing algorithm ("HA") for use with the robotic surgical instrument 5000 of FIG. 14. More particularly, in first step 6000, an end effector, e.g., end effector 5040, or end effector 5040 and shaft 5030 combination, is selectively engaged to the housing 5020 of the robotic surgical forceps 5000. In step 6010, the PCB 5066a and/or EPROM (or other controller associated with the robotic surgical forceps 5000) mechanically or electrically communicates with the end effector 5040 (or with shaft 5030 combination) to recognize the end effector 5040 and associated operating parameters and characteristics therewith, e.g., size, type, knife stroke, etc. and communicates operational data back to the PCB 5066a and/or EPROM.

In a subsequent step 6020, the PCB 5066a and/or EPROM initiates a homing algorithm ("HA") to determine a fully open position of the jaw members 5042, 5044. The homing algorithm HA includes the steps of: step 6021—slowly initiating rotation of the jaw drive input 5035 to open the jaw members 5042, 5044; step 6022—calculating a baseline torque running average utilizing one or more torque sensors 5066c associated with the jaw drive input 5035. A potential next step 6022a (shown in phantom) includes running/filtering the torque signal reading "S" through a low pass filter 6025 in potential step 6022 to avoid false readings from the torque sensor(s) 5066c and allow a more accurate average torque reading.

In a next step 6023, the homing algorithm HA analyzes readings from the torque sensor(s) 5066c (and low pass filter 5035) to determine a change in the average torque over time (Δ torque) (as opposed to a gross average torque reading). Once a predetermined Δ torque has been identified, in a next step 6024 the homing algorithm HA equates the Δ torque to the jaw members 5042, 5044 being in a fully open position relative to one another and identifies the homing position ("HP") of the jaw members 5042, 5044, the jaw drive input 5035 and/or the distal hub 5054.

In a next step 6030, the jaw drive input 5035 is rotated a set number of rotations or degrees (e.g., 1500 degrees) from the homing position HP to insure that the closure force between the jaw members falls within the typical range for sealing vessels or tissue of about 3 kg/cm$^2$ to about 16 Kg/cm$^2$. The number of degrees of rotation of the jaw drive input 5035 is typically dependent on the type of spring, spring constant, size of jaw drive input shaft 5010, thread ratio of the jaw drive input shaft 5010, etc. These and other parameters are associated with the manufacturer's specifications of the jaw drive input 5035 (and components associated therewith) and spring assembly 5055 (and components associated therewith).

In a potential next step 6040 (shown in phantom), the end effector 5040, or end effector 5040 and shaft 5030 combination, is disengaged from the housing 5020 of the robotic surgical forceps 5000 and the method repeats with step 6000, e.g., a new end effector (not shown), or end effector and shaft combination (not shown), is selectively engaged to the housing 5020 of the robotic surgical forceps 5000 and the method is repeated.

Figure 15:
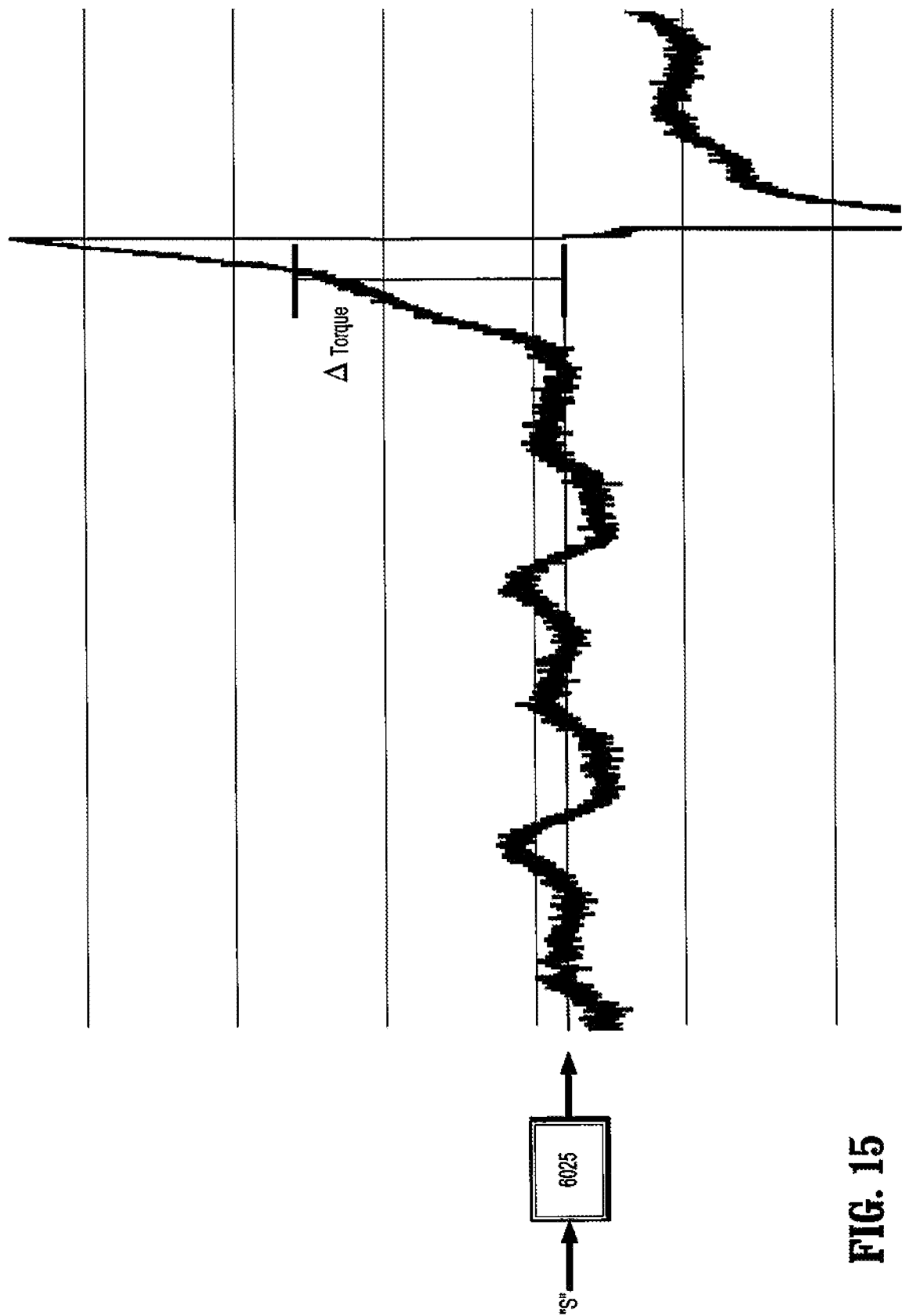
FIG. 15 is a graphical illustration showing a change in torque over time with respect to a jaw drive input for use with an embodiment of the present disclosure.

FIG. 15 shows a graphical illustration of the homing algorithm HA associated with the flow chart of FIG. 16. More particularly, the graph illustrates the change in the average torque over time (Δ torque) which marks the homing position HP of the jaw drive input 5035. Once detected, the robotic drive input controller 5065, when instructed to being a sealing cycle, communicates with the jaw drive input 5035 to rotate the jaw drive input shaft 5010 a set number of rotations or degrees, e.g., 1500 degrees, which, in turn, rotates the jaw input gear 5022 which couples to the drive gear 430. Rotation of the drive gear 430 forces the proximal hub 5052 of the spring force assembly 5050 to linearly translate against the bias of the compression spring 5056 relative to the distal hub 5054 which, in turn, linearly translates the jaw drive rod 5084 by virtue of the mechanical engagement of the proximal end of the jaw drive rod 5084 and the locking tab 5075.

Once the homing position is determined using the above method, the robotic drive input controller 5065 simply relies on the consistency of the spring 5056 having a known spring constant to accurately and consistently achieve the desired closure pressure for sealing tissue within the above-identified range, e.g., 3 kg/cm$^2$ to about 16 kg/cm$^2$ based simply on the rotation of the jaw drive input 5035. Repeatability and consistency of the closure force of the spring 5056 is assured even during heating, desiccation and shrinkage of tissue during the sealing process. The robotic drive input controller 5065 is configured to maintain the rotational orientation (e.g., degree of rotation) of the jaw drive input shaft 5010 during use allowing repeated and consistent approximation of the jaw members 5042, 5044 within the sealing range over prolonged usage.

Figure 17:
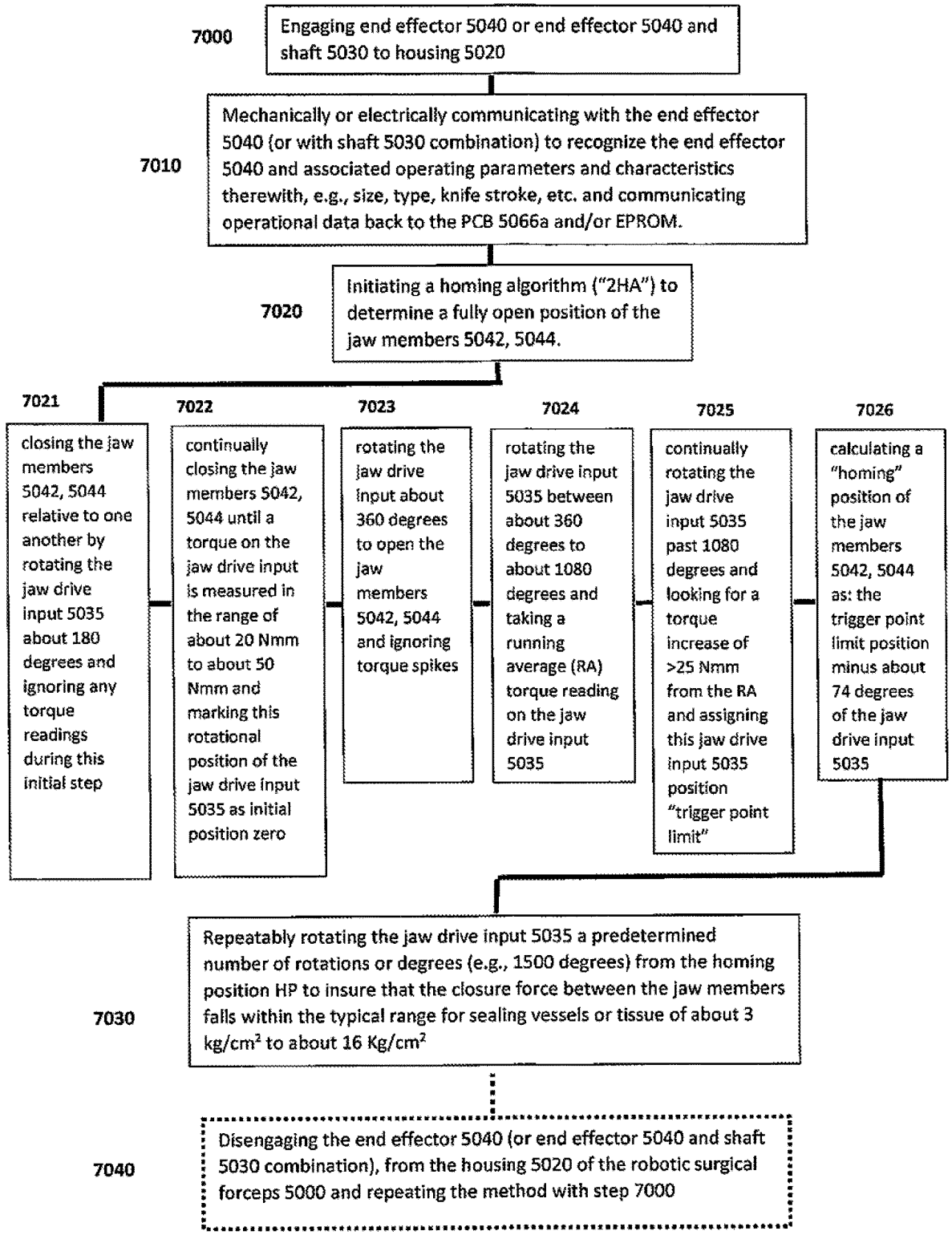
FIG. 17 is a flow diagram illustrating a method for determining a homing position of a pair of jaw members for use with the presently disclosed robotic surgical instrument.

Turning now to FIG. 17 which shows another method for providing consistent jaw closure force including a second homing algorithm ("2HA") for use with the robotic surgical instrument 5000 of FIG. 14. More particularly, in first step 7000, an end effector, e.g., end effector 5040, or end effector 5040 and shaft 5030 combination, is selectively engaged to the housing 5020 of the robotic surgical forceps 5000. In step 7010, the PCB 5066a and/or EPROM (or other controller associated with the robotic surgical forceps 5000) mechanically or electrically communicates with the end effector 5040 (or with shaft 5030 combination) to recognize the end effector 5040 and associated operating parameters and characteristics therewith, e.g., size, type, knife stroke, etc. and communicates operational data back to the PCB 5066a and/or EPROM.

In a subsequent step 7020, the PCB 5066a and/or EPROM initiates the second homing algorithm ("2HA") to determine home the jaw members 5042, 5044 which includes: step 7021—closing the jaw members 5042, 5044 relative to one another by actuating the jaw drive input 5035 and engaging the jaw input gear 5022 and ignoring any torque readings during this initial step, the jaw members 5042, 5044 in this step may be closed initially by rotating the jaw drive input 5035 about 180 degrees; step 7022—continually closing the jaw members 5042, 5044 via actuation of the jaw drive input 5035 until the robotic drive input controller 5065 (via a torque sensor) measures a torque on the jaw drive input 5035 in the range of about 20 Nmm to about 50 Nmm and marking this rotational position of the jaw drive input 5035 as initial position zero; step 7023 involves rotating the jaw drive input about 360 degrees to open the jaw members 5042, 5044 and ignoring torque spikes; step 7024—rotating the jaw drive input 5035 between about 360 degrees to about 1080 degrees and taking a running average torque reading on the jaw drive input 5035 (in a possible additional step, the running average torque is passed through a low pass filter); step 7025—continually rotating the jaw drive input 5035 past 1080 degrees and looking for a torque increase of greater than 25 Nmm (>25 Nmm) from the running average reading and assigning this position of the jaw drive input 5035 as a "trigger point limit" (in a possible additional step—two or more consecutive readings of an increase >25 Nmm are used to determine the trigger point limit); and step 7026—assigning/calculating a "homing" or "Full Open" position of the jaw members 5042, 5044 on the position of the jaw drive input 5035 as: the trigger point limit position minus about 74 degrees of the jaw drive input 5035.

In a next step 7030, the jaw drive input 5035 is rotated a predetermined number of rotations or degrees (e.g., 1500 degrees) from the homing position HP to insure that the closure force between the jaw members falls within the typical range for sealing vessels or tissue of about 3 kg/cm$^2$ to about 16 Kg/cm$^2$. Typically, this is performed with the shaft 5030 being straight or unarticulated. The number of degrees of rotation of the jaw drive input 5035 is typically dependent on the type of spring, spring constant, size of jaw drive input shaft 5010, thread ratio of the jaw drive input shaft 5010, etc. These and other parameters are associated with the manufacturer's specifications of the jaw drive input 5035 (and components associated therewith) and spring assembly 5055 (and components associated therewith).

In a potential next step 7040 (shown in phantom), the end effector 5040, or end effector 5040 and shaft 5030 combination, is disengaged from the housing 5020 of the robotic surgical forceps 5000 and the method repeats with step 7000, e.g., a new end effector (not shown), or end effector and shaft combination (not shown), is selectively engaged to the housing 5020 of the robotic surgical forceps 5000 and the method is repeated.

Figure 18:
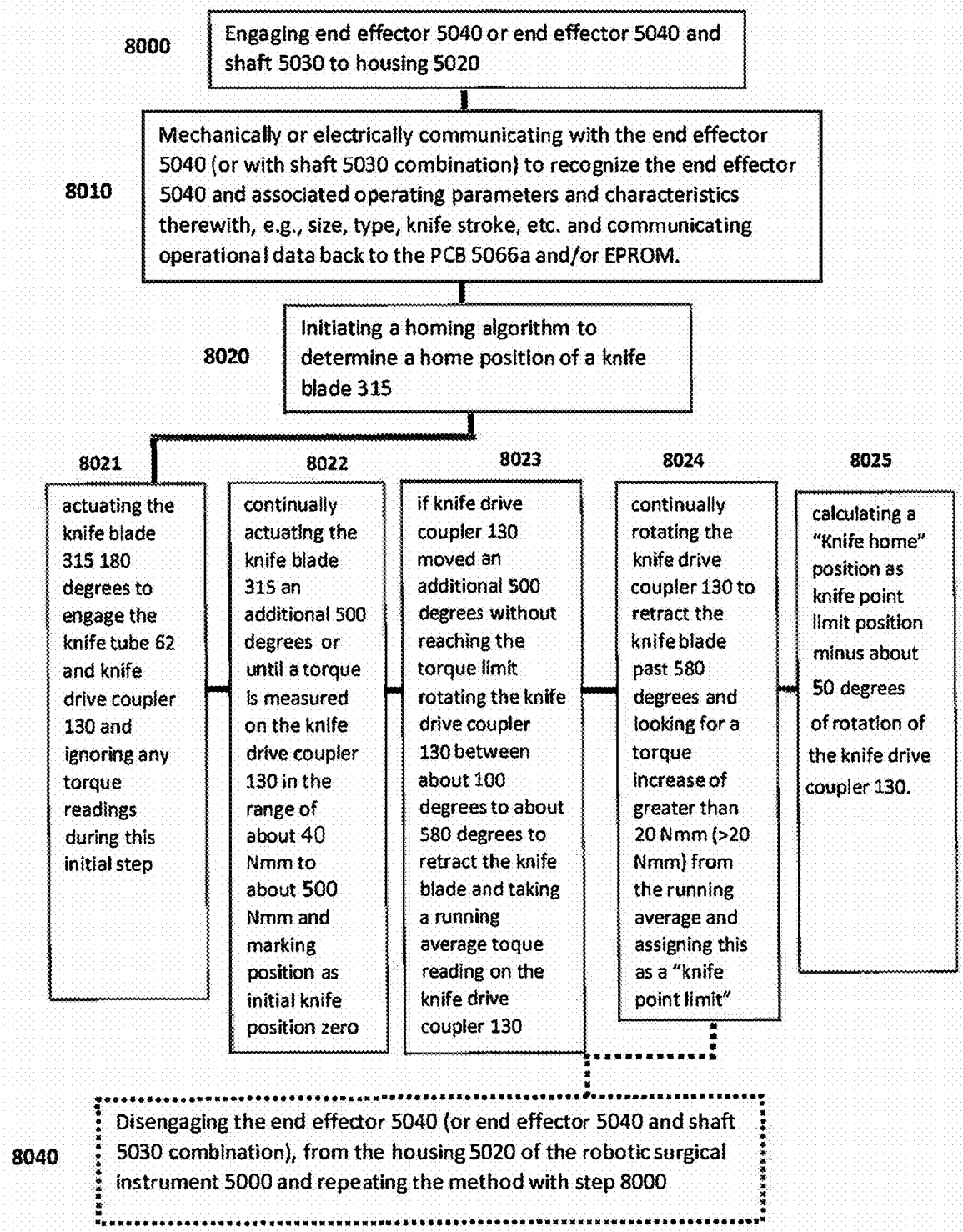
FIG. 18 is a flow diagram illustrating a method for determining a homing position of a knife blade disposed between a pair of jaw members for use with the presently disclosed robotic surgical instrument.

As mentioned above, the present disclosure also relates to methods for detecting the home position for the knife blade 315 (see FIG. 1). FIG. 18 shows one method for detecting the home position for the knife blade 315 including a knife homing algorithm ("KHA") for use with the robotic surgical instrument 5000 of FIG. 14. More particularly, in first step 8000, an end effector, e.g., end effector 5040, or end effector 5040 and shaft 5030 combination, is selectively engaged to the housing 5020 of the robotic surgical forceps 5000. In step 8010, the PCB 5066*a* and/or EPROM (or other controller associated with the robotic surgical forceps 5000) mechanically or electrically communicates with the end effector 5040 (or with shaft 5030 combination) to recognize the end effector 5040 and associated operating parameters and characteristics therewith, e.g., size, type, knife stroke, etc. and communicates operational data back to the PCB 5066*a* and/or EPROM.

In a subsequent step 8020, the PCB 5066*a* and/or EPROM initiates the knife homing algorithm ("KHA") to determine the home position of the knife blade 315 which includes: 8021—actuating the knife blade 315 to engage the knife tube 62 (FIG. 6) and sub-assembly 300 (FIG. 3) and ignoring any torque readings during this initial step, the knife blade 315 in this step may be extended initially by rotating the knife drive coupler 130 about 180 degrees; step 8022—continually actuating the knife blade 315 via actuation of the knife drive coupler 130 an additional 500 degrees or until the robotic drive input controller 5065 (via a torque sensor) measures a torque limit on the knife drive coupler 130 in the range of about 40 Nmm to about 500 Nmm and marking this rotational position of the knife drive coupler 130 as initial knife position zero; step 8023—if the knife drive coupler 130 was able to move an additional 500 degrees without reaching the torque limit—rotating the knife drive coupler 130 between about 100 degrees to about 580 degrees to retract the knife blade 315 and taking a running average torque reading on the knife drive coupler 130; step 8024—continually rotating the knife drive coupler 130 to retract the knife blade past 580 degrees and looking for a torque increase of greater than 20 Nmm (>20 Nmm) from the running average reading and assigning this position of the knife drive coupler 130 as a "knife point limit" (in a possible additional step—two or more consecutive readings of an increase >20 Nmm are used to determine the knife point limit); and step 8025—assigning a "Knife home" position as knife point limit position minus about 50 degrees of rotation of the knife drive coupler 130.

In a potential next step 8040 (shown in phantom), the end effector 5040, or end effector 5040 and shaft 5030 combination, is disengaged from the housing 5020 of the robotic surgical forceps 5000 and the method repeats with step 8000, e.g., a new end effector (not shown), or end effector and shaft combination (not shown), is selectively engaged to the housing 5020 of the robotic surgical forceps 5000 and the method for homing the knife blade 315 is repeated.

Figure 19:
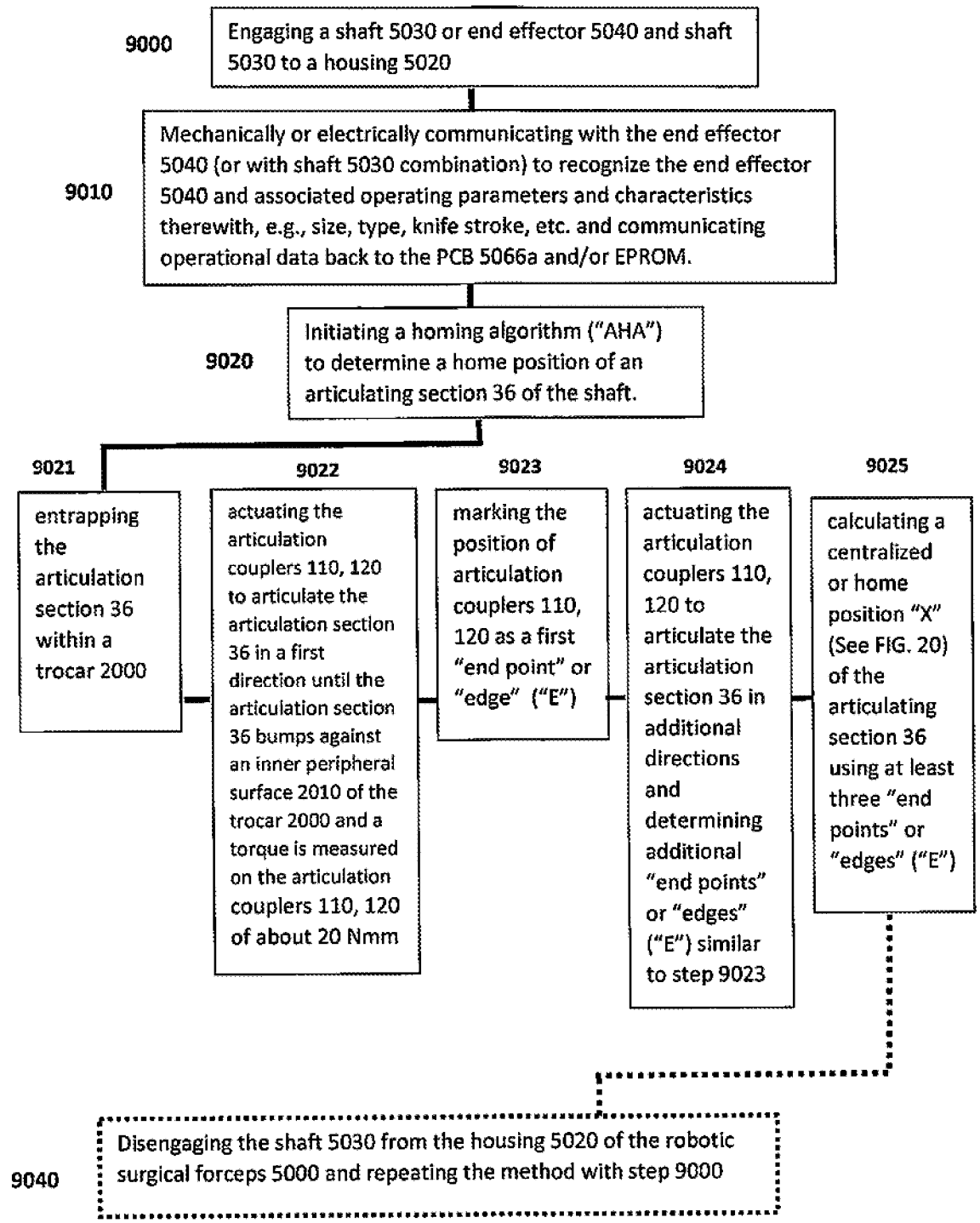
FIG. 19 is a flow diagram illustrating a method for determine a homing position of an articulating section of a shaft for use with the presently disclosed robotic surgical instrument.

As mentioned above, the present disclosure also relates to methods for detecting the homing position for the articulating section 36 (see FIG. 1). FIG. 19 shows one method for detecting the home position (or straight position) for the articulating section 36 including an articulation homing algorithm ("AHA") for use with the robotic surgical instrument 5000 of FIG. 14. More particularly, in first step 9000, an end effector, e.g., end effector 5040, or end effector 5040 and shaft 5030 combination, is selectively engaged to the housing 5020 of the robotic surgical forceps 5000. In step 9010, the PCB 5066*a* and/or EPROM (or other controller associated with the robotic surgical forceps 5000) mechanically or electrically communicates with the end effector 5040 (or with shaft 5030 combination) to recognize the end effector 5040 and associated operating parameters and characteristics therewith, e.g., size, type, knife stroke, etc. and communicates operational data back to the PCB 5066*a* and/or EPROM.

Figure 20:
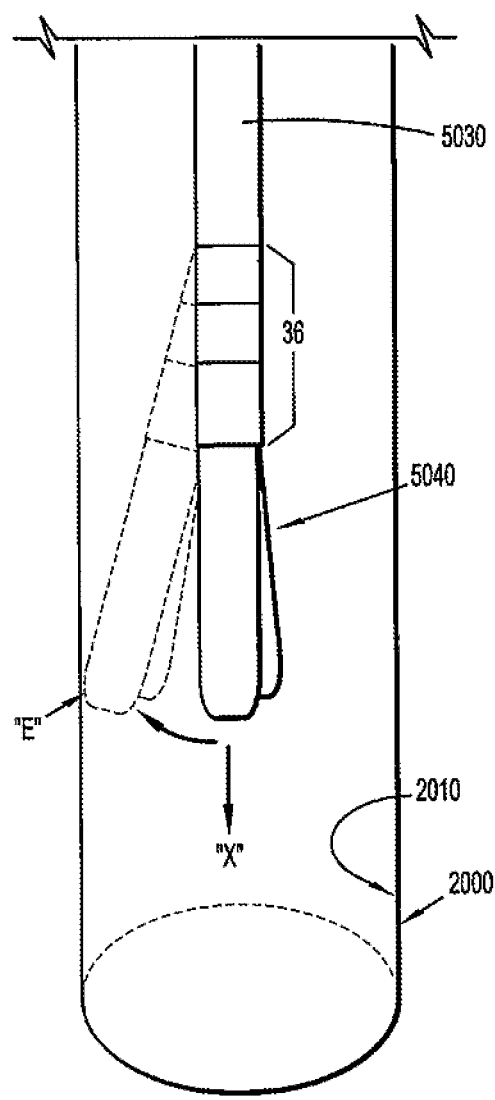
FIG. 20 is an internal view of an articulating section of the robotic surgical instrument shown within a trocar.

In a subsequent step 9020, the PCB 5066*a* and/or EPROM initiates the articulation homing algorithm ("AHA") to determine the home position of the articulation section 36 which includes: step—9021 entrapping the articulation section 36 within a trocar 2000 (FIG. 20); step 9022—actuating the articulation couplers 110, 120 (See FIG. 2B) to articulate the articulation section 36 in a first direction until the articulation section 36 bumps against an inner peripheral surface 2010 of the trocar 2000 and a torque is measured on the articulation couplers 110, 120 (or torque sensor) of about 20 Nmm; step 9023—marking the position of articulation couplers 110, 120 as a first "end point" or "edge" ("E"); step 9024—actuating the articulation couplers 110, 120 to articulate the articulation section 36 in additional directions and determining additional "end points" or "edges" similar to step 9023; step 9025—calculating a centralized or home position "X" (See FIG. 20) of the articulating section 36 using at least three "end points" or "edges" ("E").

In a potential next step 9040 (shown in phantom), the shaft 5030 or the shaft 5030 and end effector 5040 combination is disengaged from the housing 5020 of the robotic surgical forceps 5000 and the method repeats with step 9000, e.g., a new shaft 5030 and articulating section 36 or a new shaft 5030, articulating section 36 and end effector 5040 combination (not shown), is selectively engaged to the housing 5020 of the robotic surgical forceps 5000 and the method for homing the articulating section 36 is repeated.

Figure 21:
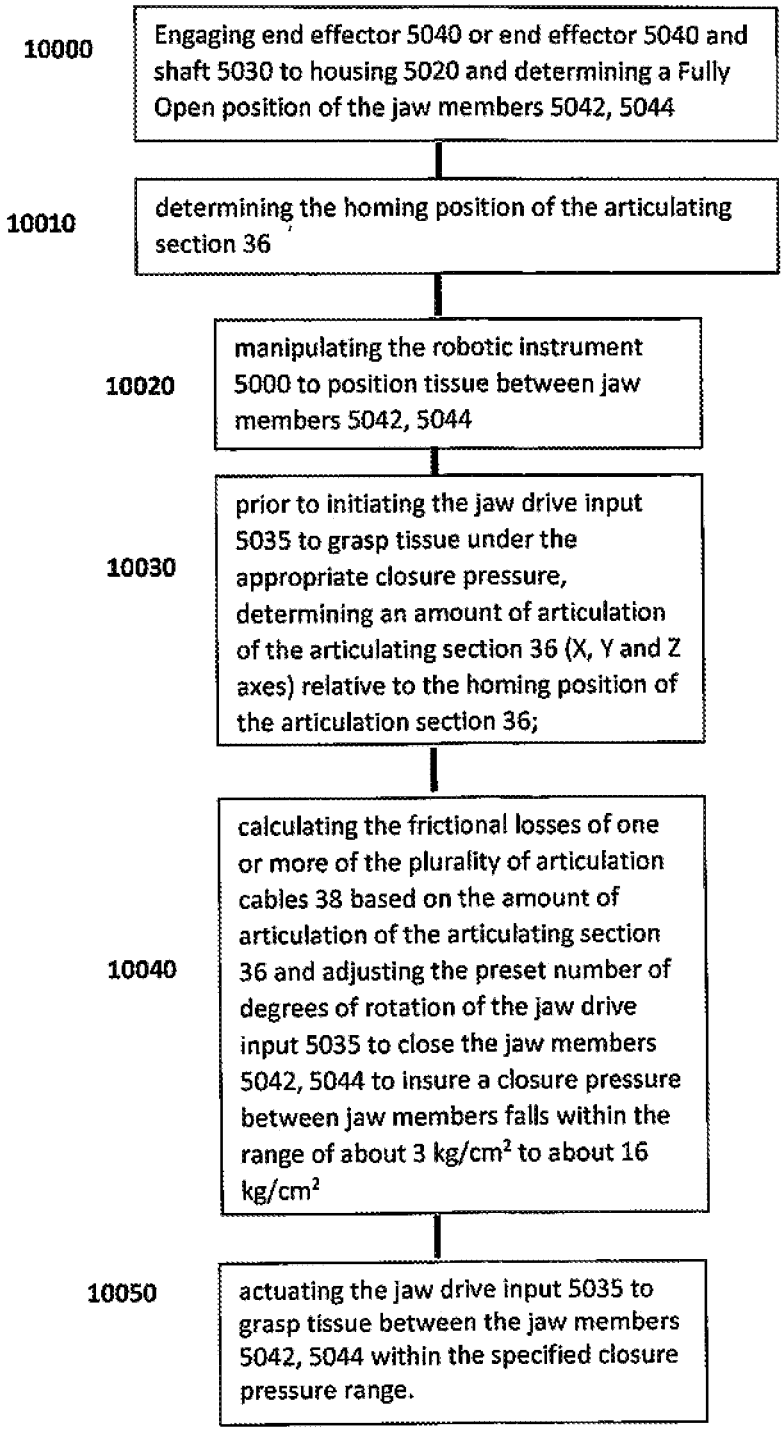
FIG. 21 is a flow diagram illustrating a method for determining the frictional losses of one or more articulation cables of the robotic surgical instrument to offset the degree of rotation of a jaw input drive to insure a proper closure pressure between the jaw member of the robotic surgical instrument.

The present disclosure also relates to a method for adjusting the degrees of rotation of the jaw drive input 5035 for closing the jaw members 5042, 5044 depending on the amount of articulation (in the X, Y and Z axes) in the articulating section 36. FIG. 21 shows one method for adjusting the degrees of rotation of the jaw drive input 5035 for closure the jaw members 5042, 5044 for use with the robotic surgical instrument 5000 of FIG. 14. More particularly, in first step 10000 the fully open position of the jaw members 5042, 5044 is determined, e.g., in accordance with one of the methods described above; step 10010—determining the homing position of the articulating section 36, e.g., in accordance with one or more of the methods described above; step 10020—manipulating the robotic instrument 5000 to position tissue between jaw members 5042, 5044; step 10030—prior to initiating the jaw drive input 5035 to grasp tissue under the appropriate closure force, determining an amount of articulation of the articulating section 36 (X, Y and Z axes) relative to the homing position of the articulation section 36; step 10040—calculating the frictional losses of one or more of the plurality of articulation cables 38 based on the amount of articulation of the articulating section 36 and adjusting the preset number of degrees of rotation of the jaw drive input 5035 to close the jaw members 5042, 5044 to insure a closure pressure between jaw members in the range of about 3 kg/cm$^2$ to about 16 kg/cm$^2$; and step 10050—actuating the jaw drive input 5035 to grasp tissue between the jaw members 5042, 5044. Various methods may be employed to calculates the frictional losses associated with the articulation of the various components, e.g., look-up table, graphical analysis or mathematical equations.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A method of determining a homing position for a knife blade of a robotic surgical instrument, comprising:
   communicating with an end effector assembly engaged to a robotic surgical instrument to recognize the end effector assembly and associated operating parameters and characteristics therewith and communicating operational data back to an EPROM or PCB; and
   initiating a homing algorithm to determine a fully retracted or homing position of a knife blade disposed between a pair of jaw members of the end effector assembly, the homing algorithm including:
      actuating a knife drive coupler of the robotic surgical instrument 180 degrees to advance the knife blade to ensure engagement with a knife drive tube of the robotic surgical instrument and ignoring any torque readings from one or more sensors associated with the knife drive coupler during initial actuating;
      further actuating the knife drive coupler to advance the knife blade an additional 500 degrees and measuring a torque on the knife drive coupler;
      determining that the measured torque falls outside a range of 40 Nmm to 500 Nmm;
      rotating the knife drive coupler between 100 degrees to 580 degrees to retract the knife blade and taking a running average torque reading on the knife drive coupler;
      continually rotating the knife drive coupler to retract the knife blade past 580 degrees looking for a torque increase on the knife drive input of greater than 20 Nmm from the running average torque reading and assigning this position of the knife drive input as a knife point limit; and
      calculating the homing position of the knife blade as the knife point limit position minus 50 degrees of rotation of the knife drive coupler.

2. The method of determining a homing position for a knife blade of a robotic surgical instrument according to claim 1, further comprising: disengaging the end effector assembly from the robotic surgical instrument, engaging a new end effector assembly, and repeating the method for finding the homing position for a knife blade of the new end effector assembly.

3. A method of determining a homing position for a knife blade of a robotic surgical instrument, comprising:
   initiating a homing algorithm to determine a fully retracted or homing position of a knife blade disposed between a pair of jaw members of an end effector assembly engaged to a robotic surgical instrument, the homing algorithm including:
      actuating a knife drive coupler of the robotic surgical instrument to advance the knife blade 180 degrees to ensure engagement with a knife assembly of the robotic surgical instrument and ignoring any torque readings from one or more sensors associated with the knife drive coupler during this initial actuating;
      further actuating the knife drive coupler to advance the knife blade about an additional 500 degrees and measuring a torque on the knife drive coupler;
      determining that the measured torque falls outside a range of 40 Nmm to 500 Nmm;
      rotating the knife drive coupler between about 100 degrees to about 580 degrees to retract the knife blade and taking a running average torque reading on the knife drive coupler;
      continually rotating the knife drive coupler to retract the knife blade past 580 degrees looking for a torque increase on the knife drive input of greater than 20 Nmm from the running average torque reading and assigning this position of the knife drive input as a knife point limit; and
   calculating the homing position of the knife blade as the knife point limit position minus 50 degrees of rotation of the knife drive coupler.

4. The method of determining a homing position for a knife blade of a robotic surgical instrument according to claim 3, further comprising: disengaging the end effector assembly from the robotic surgical instrument, engaging a new end effector, and repeating the method for finding the homing position for the knife blade of the new end effector.

5. A method of determining a homing position for a knife blade of a robotic surgical instrument, comprising:
  initiating a homing algorithm to determine a fully retracted or homing position of a knife blade disposed between a pair of jaw members of an end effector assembly engaged to a robotic surgical instrument, the homing algorithm including:
    actuating a knife drive coupler of the robotic surgical instrument to advance the knife blade to ensure engagement with a knife assembly of the robotic surgical instrument and ignoring any torque readings from one or more sensors associated with the knife drive coupler during this initial actuating;
    further actuating the knife drive coupler to advance the knife blade an additional 500 degrees and measuring a torque on the knife drive coupler;
    determining that the measured torque falls outside a range of 40 Nmm to 500 Nmm;
    rotating the knife drive coupler to retract the knife blade past a predetermined degree threshold and taking a running average torque reading on the knife drive coupler;
  continually rotating the knife drive coupler to retract the knife blade past the predetermined degree threshold looking for a torque increase on the knife drive input of greater than 20 Nmm from the running average torque reading on the knife drive coupler and assigning this position of the knife drive input as a knife point limit; and
  calculating the homing position of the knife blade as the knife point limit position minus 50 degrees of rotation of the knife drive coupler.

* * * * *